(12) United States Patent
Kolar et al.

(10) Patent No.: US 11,894,775 B2
(45) Date of Patent: Feb. 6, 2024

(54) POWER CONVERSION METHOD USING A SYNERGETIC CONTROL OF TWO POWER CONVERTERS

(71) Applicant: Infineon Technologies Austria AG, Villach (AT)

(72) Inventors: Johann Walter Kolar, Zurich (CH); Yunni Li, Zürich (CH); Jannik Robin Schaefer, Waedenswil (CH)

(73) Assignee: Infineon Technologies Austria AG, Villach (AT)

( * ) Notice: Subject to any disclaimer, the term of this patent is extended or adjusted under 35 U.S.C. 154(b) by 321 days.

(21) Appl. No.: 17/470,157

(22) Filed: Sep. 9, 2021

(65) Prior Publication Data

US 2022/0085725 A1  Mar. 17, 2022

(30) Foreign Application Priority Data

Sep. 16, 2020  (EP) .................................... 20196408

(51) Int. Cl.
*H02M 1/42* (2007.01)
*H02M 3/335* (2006.01)
(Continued)

(52) U.S. Cl.
CPC ..... *H02M 3/33573* (2021.05); *H02M 1/4208* (2013.01); *H02M 1/4216* (2013.01);
(Continued)

(58) Field of Classification Search
CPC ...... H02M 1/007; H02M 1/42; H02M 1/4208; H02M 1/4216; H02M 3/01; H02M 3/335;
(Continued)

(56) References Cited

U.S. PATENT DOCUMENTS 7,843,708 B2 * 11/2010 Seong ................ H02M 3/3376
363/21.02
2011/0011842 A1 * 1/2011 Thomas ............... B23K 9/1043
219/130.21

(Continued)

OTHER PUBLICATIONS

Antivachis, Michael, et al., "Analysis of a Synergetically controlled Two-Stage Three-Phase DC/AC Buck-Boost Converter", CPSS Transactions on Power Electronics and Applications, vol. 5, No. 1, Mar. 2020, pp. 34-53.
(Continued)

*Primary Examiner* — Gary L Laxton
(74) *Attorney, Agent, or Firm* — Murphy, Bilak & Homiller, PLLC

(57) ABSTRACT

A power conversion method is disclosed. The method includes operating a PFC converter configured to receive three input voltages and provide a DC link voltage between DC link nodes in one of at least two different operating modes, and operating an SR converter coupled to the PFC converter via the DC link nodes in one of at least two different operating modes dependent on an output voltage of the SR converter. Operating the SR converter includes regulating a voltage level of the DC link voltage dependent on a DC link voltage reference, and the at least two different operating modes of the SR converter include a buck mode and a series resonant mode.

18 Claims, 23 Drawing Sheets

(51) Int. Cl.
*H02M 3/00* (2006.01)
*H02M 1/00* (2006.01)

(52) U.S. Cl.
CPC ......... *H02M 3/01* (2021.05); *H02M 3/33576* (2013.01); *H02M 3/33592* (2013.01); *H02M 1/007* (2021.05)

(58) Field of Classification Search
CPC ......... H02M 3/33573; H02M 3/33576; H02M 3/33592
See application file for complete search history.

(56) References Cited

U.S. PATENT DOCUMENTS

| | | | | |
|---|---|---|---|---|
| 2012/0112720 A1* | 5/2012 | Remmert | ................ | H02M 3/28 323/283 |
| 2013/0010501 A1* | 1/2013 | Huang | ................ | H02M 1/4225 363/21.02 |
| 2019/0245432 A1 | 8/2019 | Yan et al. | | |

OTHER PUBLICATIONS

Dick, Christian, et al., "Optimized buck mode modulation strategy and control of a LLC-type resonant converter in a solar application", IEEE 16th European conference on power electronics and applications, Aug. 26, 2014, pp. 1-10.

Li, Y., et al., "Optimal Synergetic Control of a Three-Phase Two-Stage Ultra-Wide Output Voltage Range EV Battery Charger Employing a Novel Hybrid Quantum Series Resonant DC/DC Converter", Nov. 9-12, 2020, pp. 1-6.

* cited by examiner

POWER CONVERSION METHOD USING A SYNERGETIC CONTROL OF TWO POWER CONVERTERS

TECHNICAL FIELD

This disclosure relates in general to a power conversion method.

BACKGROUND

Efficient power conversion using an electronic power converter is an important issue in many electronic applications. Charging batteries of electronic vehicles, for example, requires an efficient power conversion and is gaining importance as the number of electric vehicles of various kinds (cars, bicycles, scooters, etc.) is expected to increase within the next years. In this type application, but also in any other type of power conversion application it is desirable to keep losses associated with the power conversion as low as possible, that is, to keep losses occurring in the power converter and associated with operating the power converter as low as possible.

SUMMARY

One example relates to a power conversion method. The method includes operating a PFC (Power Factor Correction) converter configured to receive three input voltages and provide a DC link voltage between DC link nodes in one of at least two different operating modes, and operating an SR (Series Resonant) converter coupled to the PFC converter via the DC link nodes in one of at least two different operating modes dependent on an output voltage of the SR converter. Operating the SR converter includes regulating a voltage level of the DC link voltage dependent on a DC link voltage reference, and the at least two different operating modes of the SR converter include a buck mode and a series resonant (SR) mode.

Another example relates to a power converter circuit. The power converter circuit includes a PFC converter configured to receive three input voltages and provide a DC link voltage between DC link nodes; an SR converter coupled to the PFC converter via the DC link nodes; and a control circuit configured to operate the PFC converter in one of at least two operating modes, and operate the SR converter in one of at least two different operating modes dependent on an output voltage of the SR converter, regulate, by operating the SR converter, a voltage level of the DC link voltage dependent on a DC link voltage reference, wherein the at least two different operating modes of the SR converter include a buck mode and a series resonant (SR) mode.

Examples are explained below with reference to the drawings. The drawings serve to illustrate certain principles, so that only aspects necessary for understanding these principles are illustrated. The drawings are not to scale. In the drawings the same reference characters denote like features.

DETAILED DESCRIPTION

In the following detailed description, reference is made to the accompanying drawings. The drawings form a part of the description and for the purpose of illustration show examples of how the invention may be used and implemented. It is to be understood that the features of the various embodiments described herein may be combined with each other, unless specifically noted otherwise.

Figure 1:
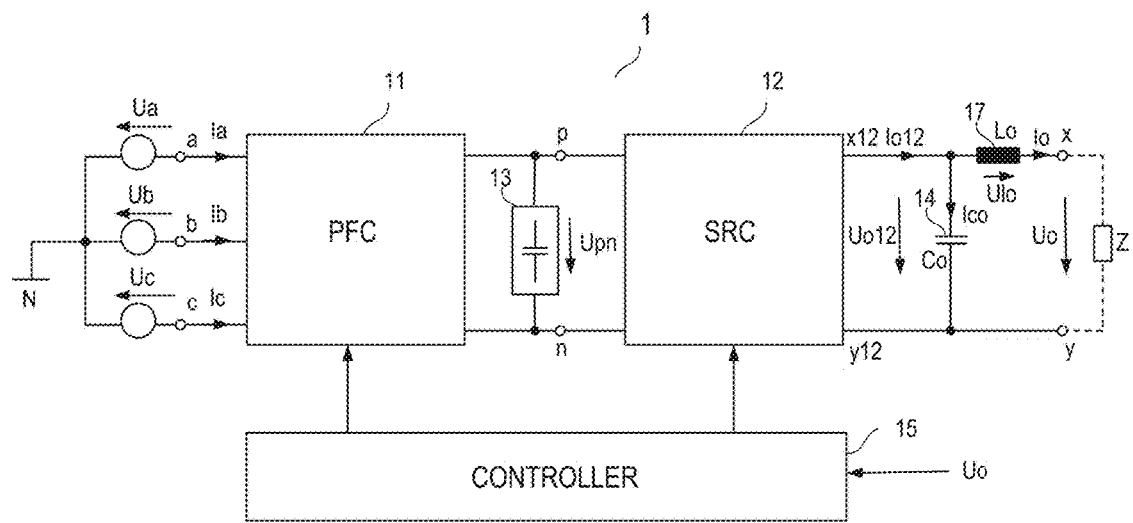
FIG. 1 illustrates a circuit diagram of a power converter arrangement with a first power converter and a second power converter.

FIG. 1 illustrates a circuit diagram of a power converter arrangement 1 according to one example. The power converter arrangement 1 includes a first power converter 11, which is implemented as a PFC (Power Factor Correction) converter, and a second power converter 12, which is implemented as a series resonant converter (SRC). The PFC converter 11, which may also be referred to as PFC rectifier, includes three input nodes a, b, c and is configured to receive a respective one of three input voltages Ua, Ub, Uc at each of the three input nodes a, b, c. More specifically, the PFC converter 11 receives a first input voltage Ua at a first input node a, a second input voltage Ub at a second input node b, and a third input voltage Uc at a third input node c. The input voltages Ua, Ub, Uc are referenced to a common reference node (ground node) N, for example. The input nodes a, b, c of the PFC converter form input nodes of the power converter arrangement.

Figure 2:
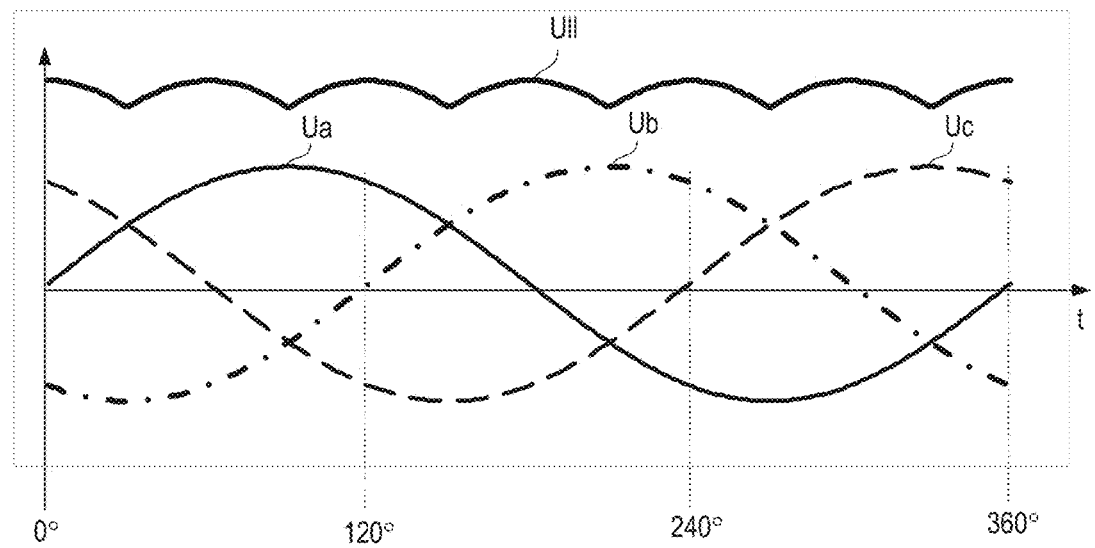
FIG. 2 shows signal diagrams of input voltages of the first power converter according to one example.

According to one example, the input voltages Ua, Ub, Uc received by the PFC converter 11 are alternating input voltages such as sinusoidal input voltages. A phase shift between each pair of these input voltages Ua, Ub, Uc is different from 0°, for example. FIG. 2 shows signal diagrams of sinusoidal input voltages Ua, Ub, Uc during one period of each of these input voltages Ua, Ub, Uc. In this example, the phase shift between each pair of these input voltages Ua, Ub, Uc is 120° (2π/3). Each of the three sinusoidal input voltages Ua, Ub, Uc periodically changes between a minimum voltage level and a maximum voltage level, wherein the maximum voltage level is a positive voltage level and the minimum voltage level is a negative voltage level in this example. According to one example, a magnitude (absolute value) of the minimum level essentially equals a magnitude (absolute value) of the maximum level and the three input voltages Ua, Ub, Uc have essentially the same minimum voltage level and the same maximum voltage level. Further, the three input voltages Ua, Ub, Uc may have essentially the same frequency. This frequency is between 50 Hz and 60 Hz, for example.

FIG. 2 illustrates the input voltages Ua, Ub, Uc dependent on a phase angle. In the following, the plurality of input voltages Ua, Ub, Uc is also referred to as input voltage system. Further, for the purpose of illustration it is assumed that a certain phase angle α of the input voltage system corresponds to a phase angle α of the first input voltage Ua, wherein α=0 is the phase angle at the beginning of a positive halfwave of the first input voltage Ua, in this example.

The magnitude (absolute value) of the maximum voltage level and the minimum voltage level of each of the input voltages Ua, Ub, Uc may also be referred to as amplitude of the input voltages Ua, Ub, Uc. Root mean square (RMS) values of the input voltages Ua, Ub, Uc are given by the amplitude divided by the square root of 2, that is, $$A_{RMS} = \frac{A}{\sqrt{2}},$$

where A denotes the amplitude of any one of the input voltages Ua, Ub, Uc and ARMS denotes the respective RMS value. According to one example, the input voltages Ua, Ub, Uc are 230 RMS grid voltages. Amplitudes of the individual input voltages Ua, Ub, Uc are 325 V in this example.

At each phase of one period of the input voltage system one of the three input voltages Ua, Ub, Uc has the highest (positive) voltage level of the input voltage system and one of the three input voltages Ua, Ub, Uc has the lowest (negative) voltage level of the input voltage system, wherein in each period of the input voltage system each of the three input voltages Ua, Ub, Uc has the highest level and the lowest level for a respective certain time period. A difference between the highest voltage level and the lowest voltage level is referred to as line-to-line-voltage Ull in the following. The line-to-line-voltage Ull associated with the input voltages Ua, Ub, Uc shown in FIG. 2 is also illustrated in FIG. 2. As can be seen, the line-to-line-voltage Ull is periodic, wherein the duration of one period of the line-to-line-voltage Ull is ⅙ of a duration of one period of the input voltage system. In other words, one period of the input voltages Ua, Ub, Uc includes phase angles from 0° to 360° (0 to 2π) and one period of the line-to-line-voltage Ull ranges over 60° of one period of the input voltage system. The maximum of the line-to-line-voltage Ull_max, which is also referred to as maximum line-to-line-voltage in the following, is given by the amplitude A of the three input voltages multiplied with the square root of 3, that is, Ull_max=√3·A. In an input voltage system with three 230 $V_{RMS}$ input voltages Ua, Ub, Uc, for example, the maximum line-to-line-voltage Ull_max is 563 V. A minimum line-to-line-voltage Ull_min is 488 V, wherein the minimum line-to-line-voltage Ull_min is given by $$\text{Ull\_min} = \text{Ull\_max} \cdot \sin 60° = \sqrt{3} \cdot A \cdot \frac{\sqrt{3}}{2} = 1.5 \cdot A. \tag{1}$$

Referring to FIG. 1, the power converter arrangement 1 includes DC link voltage nodes p, n and a DC link capacitor circuit 13 connected between the DC link voltage nodes p, n. The PFC converter 11 and the SR converter 12 are coupled via the DC link voltage nodes p, n such that an output of the PFC converter 11 is coupled to the DC link voltage nodes p, n and an input of the SR converter 12 is coupled to the DC link voltage nodes p, n. Between the DC link voltage nodes p, n a DC link voltage Upn is available.

Further, the power converter arrangement 1 includes output nodes x, y and is configured to provide, at the output nodes x, y, an output voltage Uo and an output current Io to a load Z (illustrated in dashed lines in FIG. 1). The output voltage Uo is a DC voltage according to one example.

The output nodes x, y of the power converter arrangement 1 may be formed by output nodes x12, y12 of the SR converter, so that the output current Io of the power converter arrangement 1 equals an output current Io12 of the SR converter 12 and the output voltage Uo of the of the power converter arrangement 1 equals an output voltage Uo12 of the SR converter 12.

Optionally, the power converter arrangement includes at least one of an output capacitor 14 and an output inductor 16.

The output capacitor has a capacitance Co and is connected between the output nodes x, y. The output inductor 17 has an inductance Lo and is connected between one of the output nodes x12, y12 of the SR converter 12 and one of the output nodes x, y of the power converter arrangement. It should be noted that the power converter arrangement may include the output capacitor 14 even in an operating scenario in which the load Z is a battery, as outlined herein further below. The output capacitor 14 may help to provide a commutation current path to the SR converter 12.

In case the power converter arrangement 1 includes the output capacitor 14, the output current Io of the power converter arrangement 1 is given by the output current Io12 of the SR converter 12 minus a current Ico into the output capacitor 14. In a normal operating mode of the power converter arrangement 1, however, the current Ico into the output capacitor 14 is much smaller than the output current Io12 of the SR converter 12, so that the output current Io of the power converter arrangement 1 at least approximately equals the output current Io12 of the SR converter 12, Io Io12. In the following, unless stated otherwise, Io denotes both the output current of the power converter arrangement 1 and the output current of the SR converter 12.

In case the power converter arrangement 1 includes the output inductor 17, the output voltage Uo of the power converter arrangement 1 is given by the output voltage Uo' of the SR converter 12 plus a voltage Ulo across the output inductor 17. In a normal operating mode of the power converter arrangement 1, however, the voltage Ulo across the output inductor 17 is much smaller than the output voltage Uo' of the SR converter 12, so that the output voltage Uo of the power converter arrangement 1 at least approximately equals the output voltage Uo12 of the SR converter 12, Uo≈Uo12. In the following, unless stated otherwise, Uo denotes both the output voltage of the power converter arrangement 1 and the output voltage of the SR converter 12.

The power converter arrangement is configured to generate the output voltage Uo and the output current Io based on the input voltages Ua, Ub, Uc and the corresponding input currents Ia, Ib, Ic. In order to operate efficiently, the the power converter arrangement is configured to operate in different operating modes, wherein, according to one example, the operating mode is selected dependent on the output voltage Uo. More specifically, the operating mode is selected dependent on an instantaneous voltage level of the output voltage Uo. A controller 15 receives the output voltage Uo or a signal that represents the voltage level of the output voltage and controls operation of the PFC converter 11 and the SR converter 12 dependent on the output voltage Uo.

The voltage level of the output voltage Uo may vary over a relatively wide voltage range. According to one example, the desired voltage range of the output voltage Uo varies between 200 V and 1000 V, for example. According to one example, the load Z is a battery. In this case, the voltage level of the output voltage Uo is defined by the load and may change as charge level of the battery changes.

Figure 3A:
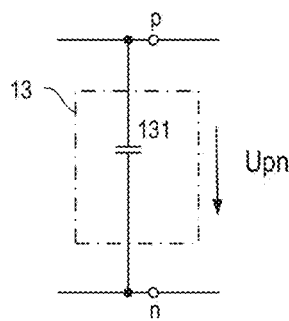
FIGS. 3A and 3B illustrate different examples of a DC link capacitor circuit connected between DC link nodes of the power converter arrangement.

The DC link capacitor circuit 13 may be implemented in various ways. According to one example illustrated in FIG. 3A, the DC link capacitor circuit 13 includes a single capacitor 131 connected between the DC link nodes p, n. According to one example illustrated in FIG. 3B, the DC link capacitor circuit 13 includes a first DC link capacitor 132 and a second DC link capacitor 133 that are connected in series between the DC link nodes p, n, and a tap 134, which is a circuit node between the first DC link capacitor 132 and the second DC link capacitor 133. In each case, the DC link voltage Upn is the voltage between the two DC link nodes p, n.

Figure 4:
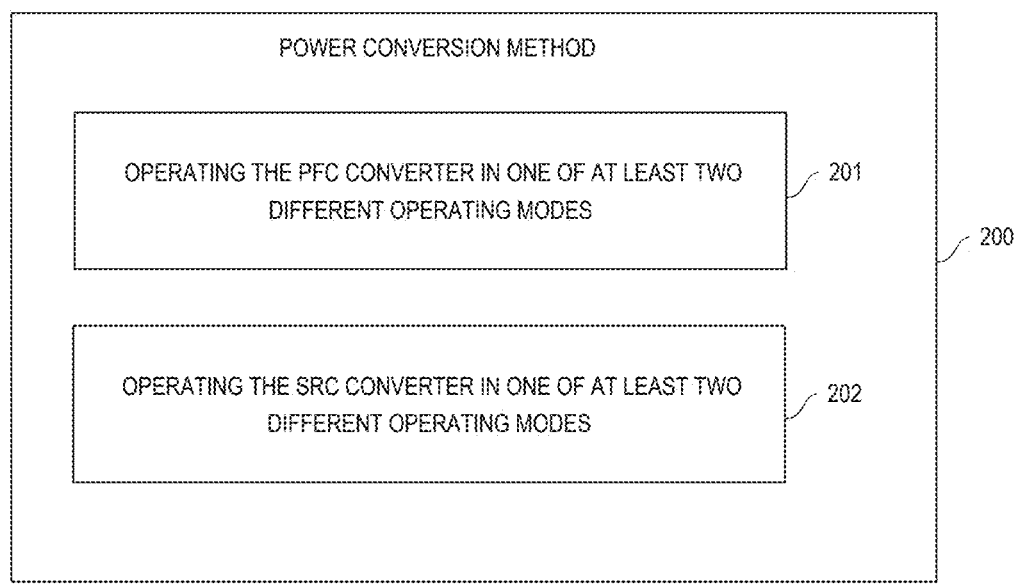
FIG. 4 illustrates a chart of one example of a power conversion method using a power converter arrangement of the type illustrated in FIG. 1.

In order to meet the voltage demand of the load Z and, at the same time, operate the power converter arrangement in an efficient way with low power losses a synergetic control of the PFC converter 11 and the SR converter 12 is employed. Referring to FIG. 4, which illustrates a chart of the power conversion method 200, the synergetic control includes operating the PFC converter 11 in one of at least two different operating modes (201), and operating the SR converter 12 in one of at least two different operating modes (202). According to one example, the operating mode of the SR converter 12 is selected dependent on the output voltage Uo, which is one operating parameter of the power converter arrangement. The operating mode of PFC converter 11 may be selected dependent on at least one further operating parameter of the power converter arrangement. Examples are explained in detail herein further below. Before explaining the synergetic control in greater detail examples of the PFC converter 11 and the SR converter 12 and of respective different operating modes of these converters 11, 12 are explained in the following.

Figure 5:
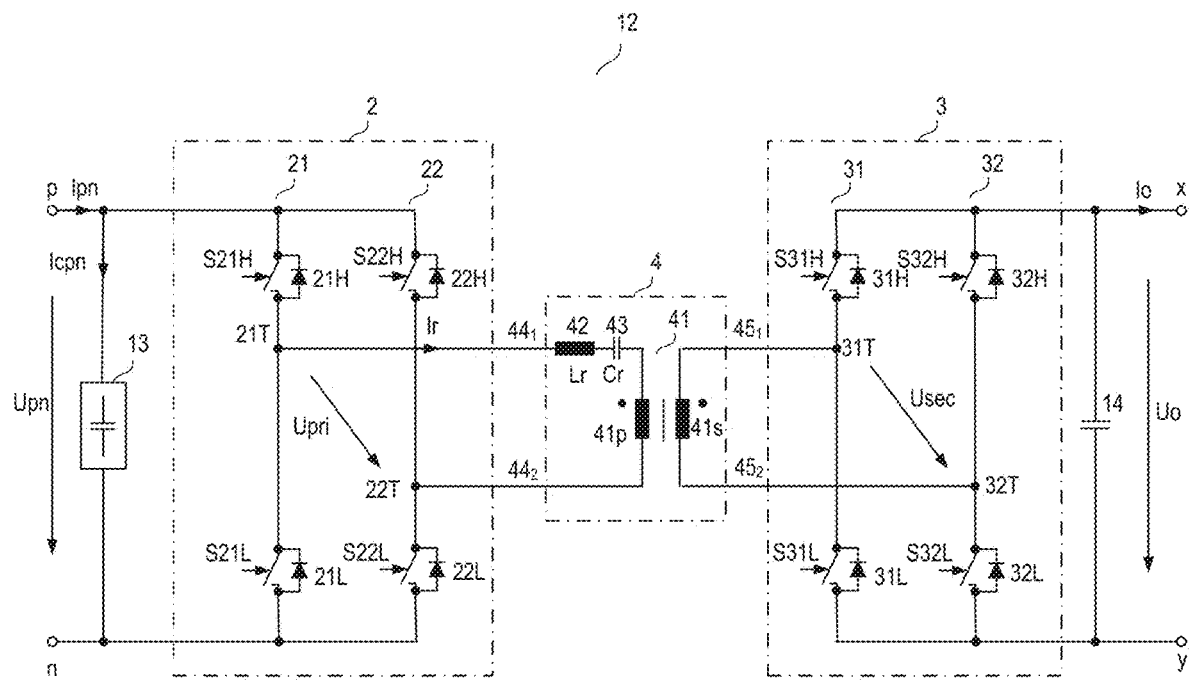
FIG. 5 illustrates a circuit diagram of one example of the second power converter implemented as a series resonant converter (SRC) and including two bridge circuits and resonant circuit.

FIG. 5 illustrates one example of the SR converter 12. In this example, the SR converter 12 includes a first bridge circuit 2, a second bridge circuit 3 and a resonant circuit (resonant tank) 4. The first bridge circuit 2 is connected between the DC link nodes p, n and the resonant circuit 4, and the second bridge circuit 3 is connected between the resonant circuit 4 and the output nodes x, y. The first bridge circuit 2 includes a first half-bridge 21 and a second half-bridge 22, each including a high-side switch 21H, 22H and a low-side switch 21L, 22L. The high-side switch 21H, 22H and the low-side switch 21L, 22L of each of the first and second half-bridges 21, 22 are connected in series between the DC link nodes p, n. Further, each of the first and second half-bridges 21, 22 includes a tap 21T, 22T, which is a circuit node between the high-side switch 21H, 22H and the low-side switch 21L, 22L of the respective half-bridge 21, 22. The tap 21T of the first half-bridge 21 is connected to a first input node $44_1$ of the resonant circuit 4 and the tap 22T of the second half-bridge 22 is connected to a second input node $44_2$ of the resonant circuit 4.

The second bridge circuit 3 includes a first half-bridge 31 and a second half-bridge 32 each including a high-side switch 31H, 32H and a low-side switch 31L, 32L. The high-side switch 31H, 32H and the low-side switch 31L, 32L of each of these half-bridges 31, 32 are connected in series between the output nodes x, y. Further, each of the first and second half-bridges 31, 32 of the second bridge circuit 3 includes a tap 31T, 32T, which is a circuit node between the high-side switch 31H, 32H and the low-side switch 31L, 32L of the respective bridge circuit 31, 32. The tap 31T of the first half-bridge 31 is connected to a first output node $45_1$ of the resonant circuit 4, and the tap 32T of the second half-bridge 32 is connected to a second output node $45_2$ of the resonant circuit 4.

Referring to FIG. 5, the resonant circuit 4 includes a transformer 41 with a primary winding 41p and a secondary winding 41s, wherein the primary winding 41p and the secondary winding 41s are inductively coupled and have the same winding sense. Further, the resonant circuit 4 includes a series circuit with an inductor 42 having an inductance Lr and a capacitor 43 having a capacitance Cr. The inductor 42 and the capacitor 43 are connected in series and are connected in series with the primary winding 41p of the transformer 41. The series circuit including the inductor 42, the capacitor 43 and the primary winding 41p is connected between the input nodes $44_1$, $44_2$ of the resonant circuit 4 and, therefore, between the tap 21T of the first half-bridge 21 and the tap 22T of the second half-bridge 22. An input voltage Upri of the resonant circuit 4, which is a voltage between the tap 21T of the first half-bridge 21 and the tap 22T of the second half-bridge 22 is referred to as primary voltage Upri in the following. The inductor 42 is also referred to as resonant inductor and the capacitor 43 is also referred to as resonant capacitor in the following.

Referring to FIG. 5, a first circuit node of the secondary winding 41s is connected to the first output node $45_1$ of the resonant circuit 4 and, therefore, to the tap 31T of the first half-bridge 31 of the second bridge circuit 3, and a second circuit node of the secondary winding 41s is connected to the second output node $45_2$ of the resonant circuit 4 and, therefore, to the tap 32T of the second half-bridge of the second bridge circuit 3. A voltage provided by the resonant circuit 4 between the tap 31T of the first half-bridge 31 and the tap 32T of the second half-bridge 32 is referred to as secondary voltage Usec in the following.

In the following, the first bridge circuit 2 is also referred to as primary side bridge circuit 2, the first half-bridge 21 and the second half-bridge 22 of the first bridge circuit 2 are also referred to as first primary side half-bridge 21 and second primary side half-bridge 22, respectively. The taps 21T, 22T of the primary side half-bridges 21, 22 are also referred to as first primary side tap 21 and second primary side tap 22, respectively. Further, in the following, the second bridge circuit 3 is also referred to as secondary side bridge circuit 3, the first half-bridge 31 and the second half-bridge 32 of the second bridge circuit 3 are also referred to as first secondary side half-bridge 31 and second secondary side half-bridge 32, respectively. The taps 31T, 32T of the secondary side half-bridges 31, 32 are also referred to as first secondary side tap 31 and second secondary side tap 32, respectively The high-side switches and low-side switches of the primary side half-bridges 21, 22 and the secondary side half-bridges 31, 32 may be implemented as conventional electronic switches. These switches are implemented as transistors, for example. According to one example, a respective freewheeling element, such as a diode, is connected in parallel with each of the switches. The freewheeling element is configured to take over a current that is to flow through the respective switch before the respective switch switches on or after the respective switch has been switched off.

Figure 6:
FIG. 6 illustrates one example for implementing switch devices in the SRC according to FIG. 5.

Referring to FIG. 6, an electronic switch and a parallel freewheeling element may be implemented as a MOSFET, such as an n-type enhancement MOSFET. The freewheeling element may be formed by an integrated body diode of the MOSFET in this case. However, this is only an example. Any other type of electronic switch may be used in the bridge circuits 2, 3 as well, wherein the freewheeling element may be an integral part of the respective switch or may be formed by an additional device connected in parallel with the respective switch. Examples of other types of electronic switches include, but are not restricted to, HEMTs (High Electron-Mobility Transistors), IGBTs (Insulated Gate Bipolar Transistors), BJTs (Bipolar Junction Transistors), or the like.

Figure 7:
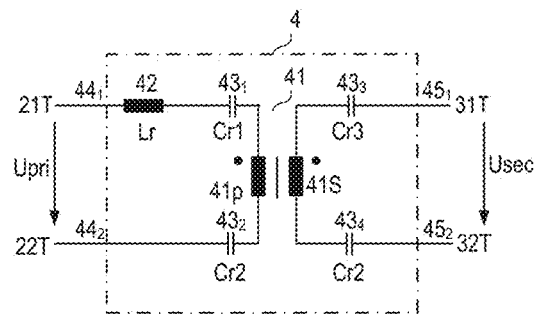
FIG. 7 illustrates another example of the resonant circuit.

FIG. 7 shows a modification of the resonant circuit 4 shown in FIG. 5. In the example shown in FIG. 7, the resonant circuit 4 includes four capacitors $43_1$-$43_4$, a first capacitor $43_1$ connected between the first input node $44_1$ and the primary winding 41p, a second capacitor $43_2$ connected between the second input node $44_2$ and the primary winding 41p, a third capacitor $43_3$ connected between the first output node $45_1$ and the secondary winding 41s, and a fourth capacitor $43_4$ connected between the second output node $45_2$ and the secondary winding 41s. In this way, an overall capacitance of the resonant circuit 4 is spilt among the primary side and the secondary side of the transformer 41, which helps to avoid saturation of the transformer 41. Further, the overall capacitance is split among both terminals of the primary winding 41p and the secondary winding 41s, which helps to reduce common-mode noise. Further, providing more than one capacitor $43_1$-$43_4$ results in a voltage across each capacitor $43_1$-$43_4$ that is lower than a corresponding voltage across the single capacitor 43. According to one example the capacitors $43_1$-$43_4$ essentially have the same capacitance, that is, Cr1≈Cr2≈Cr3≈Cr4 wherein Cr1, Cr2, Cr3, Cr4 are the respective capacitances of the capacitors $43_1$, $43_2$, $43_3$, $43_4$ shown in FIG. 7. According to one example, a capacitance Cr of the capacitor 43 illustrated in FIG. 5 essentially equals ¼ of the capacitance Cri of each of the capacitors $43_1$-$43_4$ illustrated in FIG. 7, Cr=¼·Cri, wherein Cri denotes any one of Cr1-Cr4.

SR Mode of the SR Converter

The SR converter 12 illustrated in FIG. 5 can be operated in a series resonant (SR) mode. Operating the SR converter 12 in the SR mode is explained with reference to FIGS. 8A to 8C in the following.

Figure 8A:
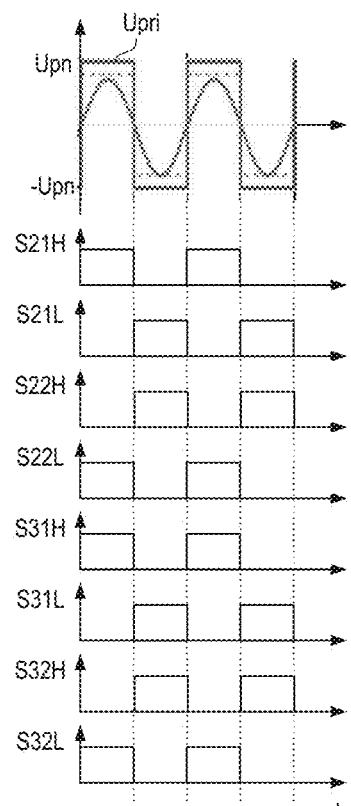
FIGS. 8A to 8C illustrate one example of operating the second power converter in a first operating mode (SR mode)

Operating the SR converter 12 in the SR mode includes generating the primary voltage Upri between the primary side taps 21T, 22T and the input nodes $44_1$, $44_2$ of the resonant circuit such that the primary voltage Upri is an alternating voltage which alternates between a positive voltage level and a negative voltage level, wherein a magnitude (absolute value) of each of the positive voltage level and the negative voltage level essentially equals the magnitude of the DC link voltage Upn. An alternating primary voltage Upri of this type is illustrated in FIG. 8A.

According to one example, the DC link voltage Upn is either a constant voltage or has a voltage waveform that corresponds to the waveform of the line-to-line-voltage Ull. This is explained in detail herein further below. In each case, the alternating primary voltage Upri is generated such that a frequency f (=1/T) of the primary voltage Upri is much higher than the frequency of the DC link voltage. Thus, the DC link voltage Upn can be considered to be constant during one period T of the primary voltage Upri. According to one example, the frequency f of the alternating primary voltage Upri is between several kHz and several 100 kHz, in particular between several 10 kHz and several 100 kHz. According to one example, the frequency f of the alternating primary voltage Upri is between 100 kHz and 200 kHz.

Generating the alternating primary voltage Upri such that it alternates between the positive level Upn and the negative level –Upn is equivalent to generating the primary voltage Upri such that it includes a sequence of positive and negative voltage pulses, wherein in each period T one positive voltage pulse and one negative voltage pulse occurs. According to one example, a duration of each of the positive voltage pulses and the negative voltage pulses at least approximately equals 50% of the period T (=1/f). In other words, each period includes two half-periods, wherein the duration of each half-period is 50% of the duration of one period T, and wherein a positive voltage pulse is generated in one of the two half-periods and a negative voltage pulse is generated in the other one of the two half-periods. In a sequence of successive half-periods positive voltage pulses and negative voltage pulses occur alternatingly.

According to one example, the frequency of the alternating primary voltage Upri at least approximately equals a resonant frequency of the resonant circuit 4. In this case, an input current (resonant current) Ir of the resonant circuit 4 is a sinusoidal current. The resonant frequency f of the resonant circuit 4 is dependent on an inductance L and a capacitance C of the resonant circuit 4 as follows:

$$f_{res} = \frac{1}{2\pi \cdot \sqrt{LC}}, \quad (2)$$

wherein L denotes an overall inductance of the resonant circuit and C denotes an overall capacitance of the resonant circuit. The overall inductance L is essentially given by the inductance Lr of the inductor (and a parasitic inductance of the transformer 41), and the overall capacitance C is either defined by the single capacitor 53 according to FIG. 5 or the several capacitors $43_1$-$43_4$ according to FIG. 7.

According to one example, the primary voltage Upri is generated such that its frequency f is between 98% and 110% of the resonant frequency $f_{res}$, in particular between 100% and 105% of the resonant frequency $f_{res}$.

Figure 8B:
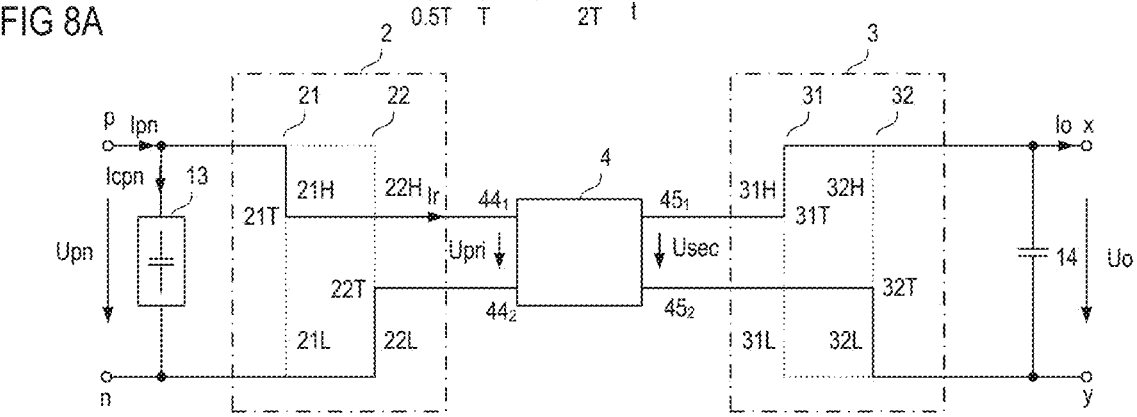

The high-side switches 21H, 22H, 31H, 32H and the low switches 21L, 22L, 31L, 32L of the first and second bridge circuit 2, 3 are switched on and off by respective drive signals S21H, S22H, S31H, S32H, S21L, S22L, S31L, S32L. These drive signals S21H-S32L are generated by the control circuit 15 (which is not illustrated in FIG. 5). Generating positive voltage pulses of the primary voltage Upri by the primary side bridge circuit 2 includes switching on the high-side switch 21H of the first half-bridge 21 and the low-side switch 22L of the second half-bridge 22 and switching off the high-side switch 22H of the second bridge circuit 22 and the low-side switch 21L of the first half-bridge 21. This is schematically illustrated in FIG. 8B. In this figure, connections provided between the DC link nodes p, n and the taps 21T, 22T by those switches that are switched on are illustrated in solid lines and connections which are interrupted by switching off the respective switch are illustrated in dotted lines. Signal diagrams of the drive signals S21H-S32L of the switches 21H-32L in the first and second bridge circuit 2, 3 are illustrated in FIG. 8A. These signals S21H-S32L either have an on-level that switches on the respective switch or an off-level that switches off the respective switch. Just for the purpose of illustration, the on-level is drawn as a high signal level in FIG. 8A and the off-level is drawn as a low signal level in FIG. 8A.

Figure 8C:
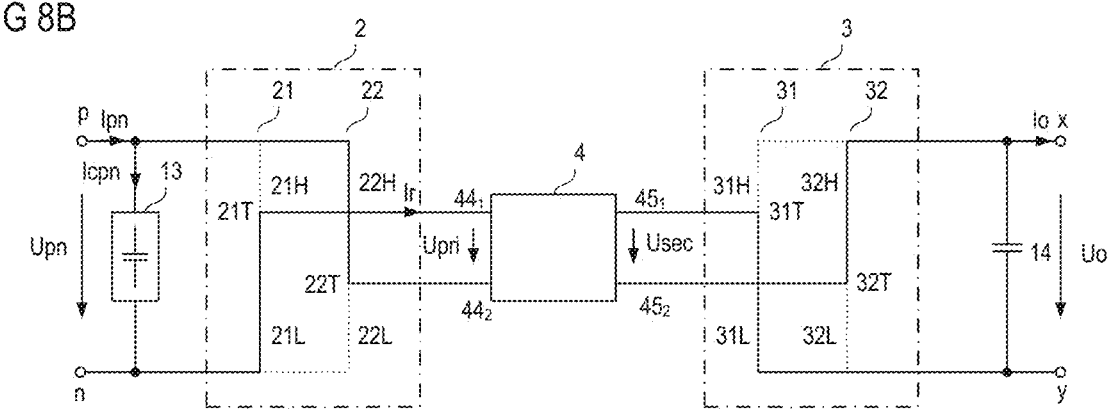

For generating negative voltage pulses of the primary voltage Upri, the high-side switch 22H of the second half-bridge 22 and the low-side switch 21L of the first half-bridge 21 are switched on and the high-side switch 21H of the first half-bridge 21 and the low-side switch 22L of the second half-bridge 22 are switched off. This is schematically illustrated in FIG. 8C.

In order to avoid cross currents through the primary side half-bridges 21, 22 there may be a dead time between switching off one of the high-side switch and the low-side switch of one of the half-bridges 21, 22 and switching on the other one of the high-side switch and the low-side switch of the respective half-bridge 21, 22. Thus, for example, there is a dead time between switching off the high-side switch 21H of the first half-bridge 21 and switching on the low-side switch 21L of the first half-bridge 21. Such dead times, however, are not illustrated in FIG. 8A. During the dead time, the freewheeling element of the switch that is to be switched on next takes over the current.

In the SR mode, the second bridge circuit 3 alternatingly connects the output nodes $45_1$, $45_2$ of the resonant circuit 4 to the first and second output node x, y of the power converter arrangement. When a positive voltage pulse of the primary voltage Upri is received by the resonant circuit 4 the second bridge circuit 3 connects the first output node $45_1$ of the resonant circuit 4 to the first output node x of the power converter arrangement and the second output node $45_2$ of the resonant circuit 4 to the second output node y of the power converter arrangement. This is achieved by switching on the high-side switch 31H of the first half-bridge 31 and the low-side switch 32L of the second half-bridge 32 and by switching off the high-side switch 32H of the second half-bridge 32 and the low-side switch 31L of the first half-bridge 31. This is schematically illustrated in FIG. 8B.

When a negative voltage pulse of the primary voltage Upri is received by the resonant circuit 4 the second bridge circuit 3 connects the first output node $45_1$ of the resonant circuit 4 to the second output node y of the power converter arrangement and the second output node $45_2$ of the resonant circuit 4 to the first output node x of the power converter arrangement. This achieved by switching on the low-side switch 31L of the first half-bridge 31 and the high-side switch 32H of the second half-bridge 32 and by switching off the high-side switch 31H of the first half-bridge 31 and the low-side switch 32L of the second half-bridge 32. Like in the first bridge circuit 2 there may be dead times between switching off one of the high-side switch and the low-side switch and switching on the other one of the high-side switch and the low-side switch of a respective half-bridge. Such dead times, however, are not illustrated in the signal diagrams illustrated in FIG. 8A.

Referring to FIGS. 8A to 8C, the first bridge circuit 2 and the second bridge circuit 3 may operate synchronously. That is, whenever the first bridge circuit 2 generates a positive voltage pulse of the primary voltage Upri, the second bridge circuit 3 connects the first output node $45_1$ of the resonant circuit 4 to the first output node x of the power converter arrangement and the second output node $45_2$ of the resonant circuit 4 to the second output node y of the power converter arrangement. Equivalently, whenever the first bridge circuit 2 generates a negative voltage pulse of the primary voltage Upri, the second bridge circuit 3 connects the first output node $45_1$ of the resonant circuit 4 to the second output node y of the power converter arrangement and the second output node $45_2$ of the resonant circuit 4 to the first output node x of the power converter arrangement.

When the SR converter 12 operates in the SR mode and the DC link voltage Upn is essentially constant at least over several periods T of the alternating voltage Upri, a voltage level of the output voltage Uo is essentially proportional to the voltage level of the DC link voltage Upn, wherein a proportionality factor is given by a winding ratio wr between a number of windings np of the primary winding 41p and a number of windings ns of the secondary winding 41s, wr=np:ns. In this case, the output voltage Uo is given by:

$$Uo = \frac{Upn}{wr} \quad (3)$$

When, for example, the primary winding 41p and the secondary winding 41s have the same number of windings so that n=1:1, the voltage level of the output voltage Uo essentially equals the voltage level of the DC link voltage Upn.

A duty cycle of each of the drive signals S21H, S22H, S31H, S32H, S21L, S22L, S31L, S32L is about 50% in the SR mode.

Buck Mode of the SR Converter

The SR converter 12 can also be operated in a buck mode. Operating the SR converter 12 in the buck mode has the effect that a ratio between the output voltage Uo and the DC link voltage Upn becomes smaller than the ratio defined by the winding ratio wr in the SR mode. When, for example, the winding ratio wr is 1:1 and the SR converter operates in the buck mode, the voltage level of the output voltage Uo is smaller than the voltage level of the DC link voltage Upn. In general, in the buck mode, $$Uo < \frac{Upn}{wr}. \tag{4}$$

According to one example, operating the SR converter 12 in the buck mode is based on operating the SR converter in the SR mode. Referring to FIGS. 8A to 8C, operating the SR converter 12 in the SR mode includes generating the primary voltage Upri such that the primary voltage Upri is an alternating voltage with an amplitude that equals the magnitude (absolute value) of the DC link voltage Upn. The buck mode is different from the SR mode in that in some of the half-periods the amplitude of the primary voltage Upri is lower than the magnitude of the DC link voltage Upn for a predefined time period. These half-periods are referred to as buck half-periods in the following.

Figure 9A:
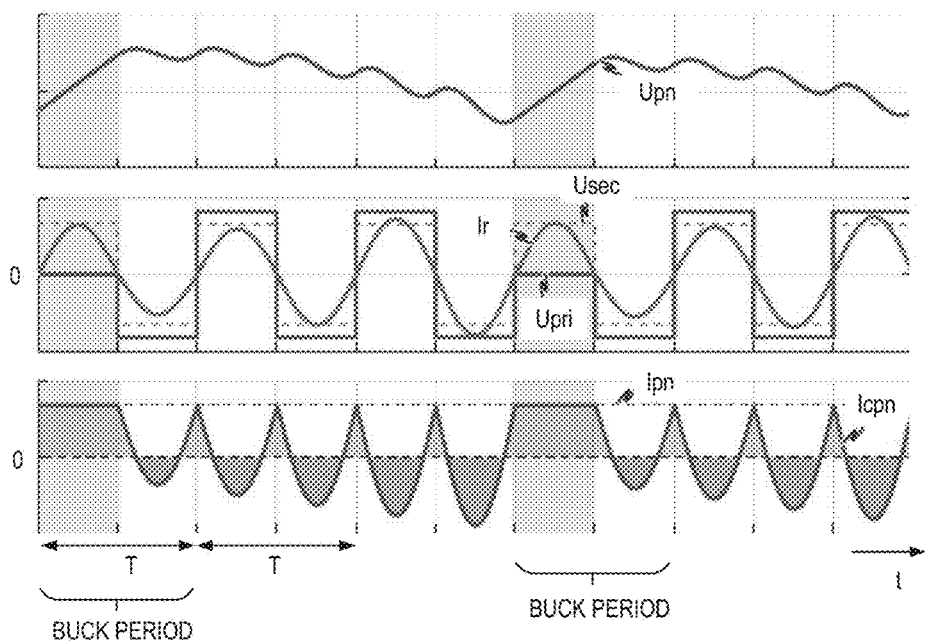
FIGS. 9A to 9C illustrate one example of operating the second power converter in a second operating mode (buck mode)
Figure 9B:
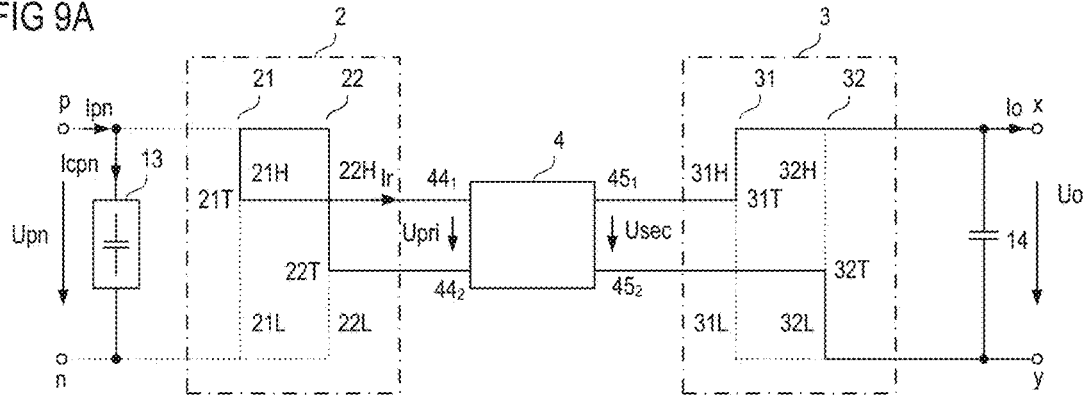
Figure 9C:
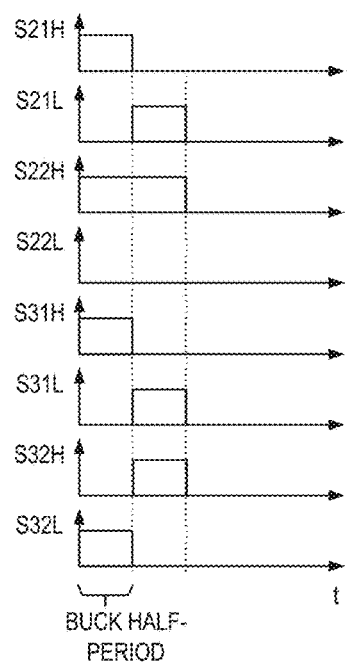

FIGS. 9A to 9C illustrate one example of operating the SR converter 12 in the buck mode, wherein FIG. 9A shows signal diagrams of the DC link voltage Upn, the primary voltage Upri, the secondary voltage Usec, a resonant current Ir, a DC link current Ipn, and a DC link capacitor current Icpn when the SR converter 12 is operated in the buck mode. Referring to FIG. 5, the DC link current Ipn is the current flowing from the DC link nodes p, n towards the SR converter 12, and the DC link capacitor current Icpn is the current flowing into the DC link capacitor circuit 13. The DC link current Ipn may also be referred to as output current of the PFC converter 11. The DC link capacitor current Icpn can be positive or negative. Just for the purpose of illustration it is assumed that the DC link capacitor circuit 13 is charged and the DC link voltage Upn increases when the DC link capacitor current Icpn is positive and the DC link capacitor circuit 13 is discharged and the DC link voltage Upn decreases when the DC link capacitor current Icpn is negative. The resonant current Ir is the current in the resonant tank FIG. 9B illustrates switching states of the switches 21H-22L, 31H-32L in the first bridge circuit 2 and the second bridge circuit 3 during a time period in which a reduced amplitude of the primary voltage Upri is generated, and FIG. 9C illustrate drive signals S21H-S22L, S31H-S32L of the switches 21H-22L, 31H-32L in the first and second bridge circuits 2, 3 in the operating state illustrated in FIG. 9B.

In the example illustrated in FIGS. 9A to 9C, the reduced amplitude in the buck half-periods is zero, and the duration for which the reduced amplitude occurs is the duration of the respective buck half-period. In the example illustrated in FIGS. 9A to 9C, this is achieved by replacing, in one half-period, a positive voltage pulse by a zero pulse, that is, a voltage pulse having zero amplitude. Referring to FIG. 9B, this can be achieved by switching on the high-side switches 21H, 22H of the first and second half-bridge 21, 22 at the same time while the low-side switches 21L, 22L are switched off. Alternatively (not shown) the low-side switches 21L, 22L are switched on at the same time while the high-side switches 21H, 22H are switched off.

Throughout the buck mode, the secondary side bridge circuit 3 may operate in the same fashion as in the SR mode. That is, in the example shown in FIGS. 9A to 9C, in which, in some half-periods, positive voltage pulses are replaced by zero pulses, the second bridge circuit 3 is operated in the same way as during positive voltage pulses of the primary voltage Upri. That is, the first output node $45_1$ of the resonant circuit 4 is connected to the first output node x of the power converter arrangement and the second output node $45_2$ of the resonant circuit 4 is connected to the second output node y of the power converter arrangement.

Referring to FIG. 9A, during the zero pulse, the DC link capacitor current Icpn equals the DC link current Ipn so that the DC link voltage Upn increases. No energy is received by the resonant circuit 4 from the primary side switch circuit 2 when a zero pulse on the primary side occurs, that is, the current from the primary side bridge circuit 2 into the resonant circuit 4 is zero. In the buck mode, between the buck periods the SR converter 12 operates in the same way as in the SR mode. Referring to the above, in the SR mode, in a steady state, there is a fixed voltage ratio between the output voltage Uo and the DC link voltage Upn, wherein the voltage ratio is given by the winding ratio wr. Thus, between the buck periods, the DC link voltage Upn approaches a voltage level that is defined by this winding ratio wr, so that between the buck half-periods, the (average) DC link voltage Upn decreases. The ripples in the DC link voltage Upn illustrated in FIG. 9A result from the fact that during positive and negative voltage pulses of the primary voltage Upri, the current received by the resonant circuit 4 from the DC link capacitor circuit 13 varies.

It can be assumed that an average of the DC link current Ipn changes slowly so that the average of DC link current Ipn is essentially constant over a plurality of periods of the primary voltage Upri. It should be noted that in FIG. 9A the average of the DC link current (the PFC converter output current) is illustrated. Thus, the voltage level of the DC link voltage Upn can be adjusted relative to the voltage level of the output voltage Uo by suitably selecting (a) the amplitude of the reduced voltage pulses; (b) the duration of the reduced voltage pulses within the respective buck half-periods; and (c) the ratio between the number of buck half-periods and the number of SR periods in a given number of half-periods or in a given time period. In the example shown in FIGS. 9A to 9C, (i) the reduced amplitude is zero, (ii) the duration of the reduced amplitude equals the duration of one half-period of the primary voltage Upri, and (iii) every sixth half-period of the primary voltage Upri is a buck period. Basically, the higher the ratio between the number of buck half-periods and SR half-periods, the higher is the voltage level of the DC link voltage Upn relative to the voltage level of the output voltage Uo.

According to one example, it is desired to adjust a ratio $$r = \frac{wr \cdot Uo}{Upn}$$

between wr-times the output voltage Uo and the DC link voltage Upn. This voltage ratio may be achieved in the buck mode by generating buck half-periods such that they include zero pulses (instead of positive or negative pulses) throughout the duration of the respective half-periods and such that a ratio between a number $N_{buck}$ of buck half-periods and an overall number $N_{tot}$ of half-periods in a given time period is essentially given by r, that is, $N_{buck}/N_{tot} \approx r$.

In the example shown in FIGS. 9A to 9C, in the buck half-periods, positive voltage pulses are replaced by zero voltage pulses. This, however, is only an example. According to another example (not shown) in the buck half-periods, negative voltage pulses are replaced by zero voltage pulses.

Figure 3B:
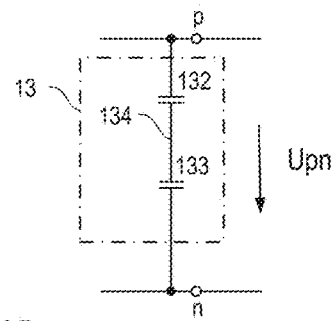
Figure 10:
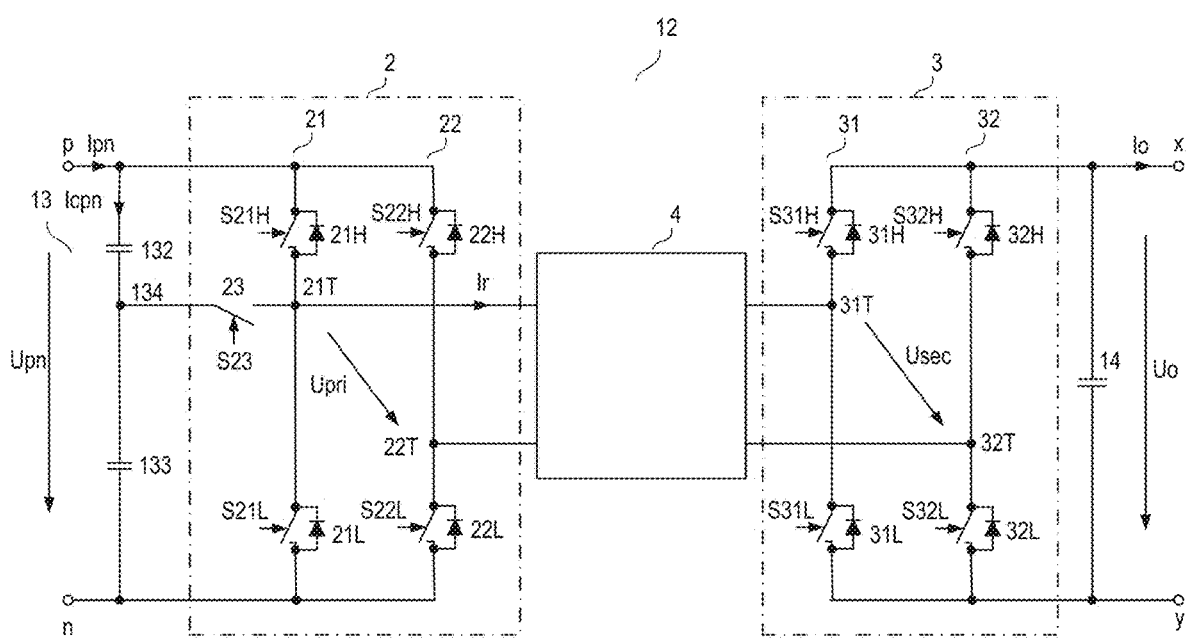
FIG. 10 illustrates a modification of the SRC shown in FIG. 5.

FIG. 10 illustrates an SR converter 12 according to another example. This SR converter 12 may be used when the DC link capacitor circuit 13 is implemented as illustrated in FIG. 3B and includes a first DC link capacitor 132 and a second DC link capacitor 133. The SR converter 12 shown in FIG. 12 is based on the SR converter shown in FIG. 5, wherein the first bridge circuit 2 additionally includes a switch 23 connected between the tap 134 of the DC link capacitor circuit 13 and the tap 21T of the first half-bridge 21. The circuit path between the tap 134 of the DC link capacitor circuit 13 and the tap 21T of the first half-bridge 21 is referred to as T-leg in the following. Consequently, the further switch 23 is referred to as T-leg switch 23 in the following. According to one example, the T-leg switch 23 is a bidirectionally blocking switch. This type of electronic switch can be implemented, for example, by connecting two MOSFETs in series in such a way that integrated body diodes of the MOSFETs are connected in a back-to-back configuration.

Figure 12A:
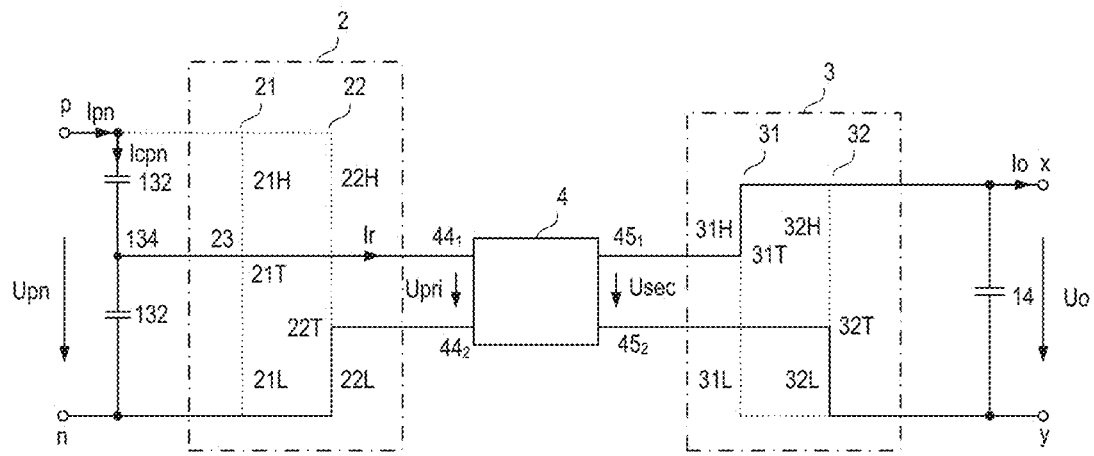
FIGS. 12A and 12B illustrate current paths in the SRC according to FIG. 10 in certain time periods of the method according to FIG. 11.
Figure 12B:
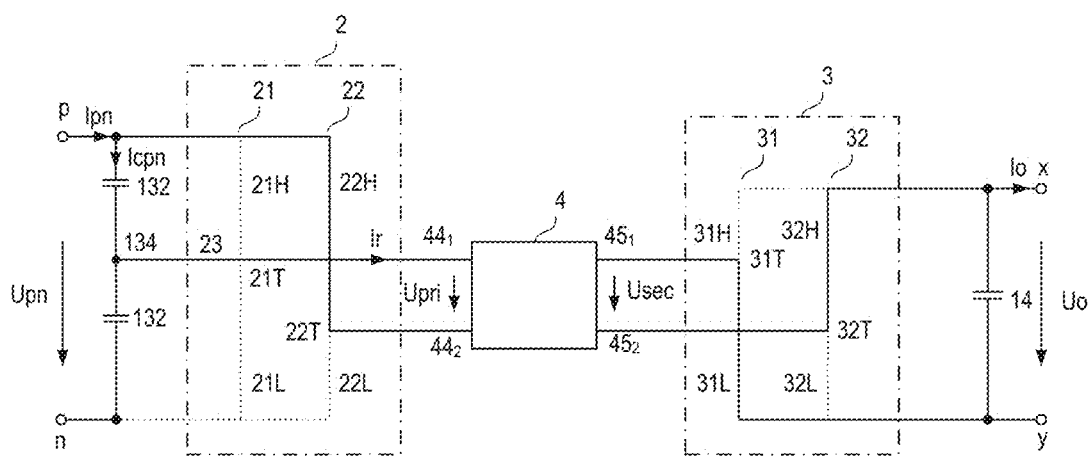

In the SR converter shown in FIG. 5, the primary voltage Upri can be generated such that it has one of three different voltage levels, Upn, 0, −Upn. In the SR converter shown in FIG. 10, the first and second DC link capacitors 132, 133 may be implemented such that they essentially have the same capacitance. In this case, the voltage across each of these DC link capacitors 132, 133 essentially equals 50% of the DC link voltage Upn. Thus, in the SR converter shown in FIG. 10, the primary voltage Upri can be generated such that it has one of five different voltage levels, Upn, 0.5·Upn, 0, −0.5·Upn, −Upn. The voltage level of the primary voltage Upri is 0.5·Upn when the T-leg switch 23 and the low-side switch 22L of the second primary side half-bridge 22 are switched on and the other switches of the primary side bridge circuit 2 are switched off. This switching state is illustrated in FIG. 12A. The voltage level of the primary voltage Upri is −0.5·Upn when the T-leg switch 23 is switched on and the high-side switch 22H of the second bridge circuit 22 is switched on and the other switches of the primary side bridge circuit 2 are switched off. This switching state is illustrated in FIG. 12B.

The SR converter shown in FIG. 10 can be operated in the buck mode by replacing positive voltage pulses in certain half-periods by reduced positive voltage pulses and/or by replacing negative voltage pulses in certain half-periods by reduced negative voltage pulses. The "reduced positive voltage pulse" is a voltage pulse with a magnitude (an absolute value) that essentially equals 50% of the voltage level of the DC link voltage Upn, and a "reduced negative voltage pulse" is a negative voltage pulse having a magnitude that essentially equals 50% of the magnitude of the DC link voltage Upn.

Figure 11:
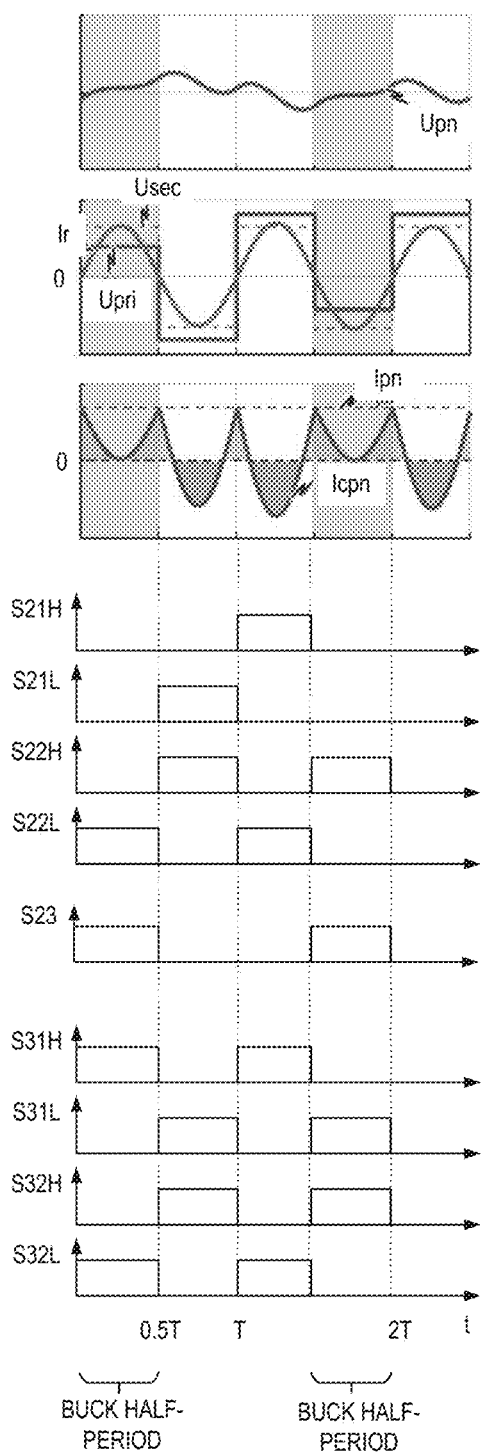
FIG. 11 illustrates one example of operating a second power converter of the type shown in FIG. 10 in the second operating mode (buck mode)

FIG. 11 illustrates generating two buck half-periods. In a first one of these buck half-periods the positive voltage pulse is replaced by a reduced positive voltage pulse, and in a second one of these buck half-periods, the negative voltage pulse is replaced by a reduced negative voltage pulse. Drive signals of the switches in the first and second bridge circuits 2, 3 are also illustrated in FIG. 11.

Like in the buck mode explained with reference to FIGS. 8A to 8C, operating the secondary side bridge circuit 3 in the buck mode is identical to operating the second bridge circuit 3 in the SR mode. That is, in a buck half-period in which the positive voltage pulse is replaced by a reduced positive voltage pulse, the secondary side bridge circuit 3 is operated in the same way as in the SR mode when a positive voltage pulse is applied to the resonant circuit 4. This is illustrated in FIG. 12A. Equivalently, in the buck mode, when the reduced negative voltage pulse is applied to the resonant circuit 4, the secondary side bridge circuit 3 is operated in the same way as in the SR mode when the negative voltage pulse is applied to the resonant circuit 4.

In the type of buck mode illustrated in FIG. 11, like in the type of buck mode illustrated in FIGS. 9A to 9C, a ratio between the voltage level of the output voltage Uo and a voltage level of the DC link voltage Upn can be adjusted by the ratio between the number of buck half-periods and the overall number of half-periods within a given time period. Just for the purpose of illustration, in FIG. 11, two out of five half-periods are buck half-periods. Basically, the number of buck half-periods within a given time period is dependent on a desired ratio between the output voltage Uo and the DC link voltage Upn, wherein the number of buck half-periods increases as the ratio between the output voltage Uo and the DC link voltage Upn increases. That is, the lower the output voltage Uo relative to the DC link voltage Upn the more buck half-periods are required within a given time period.

Figure 13:
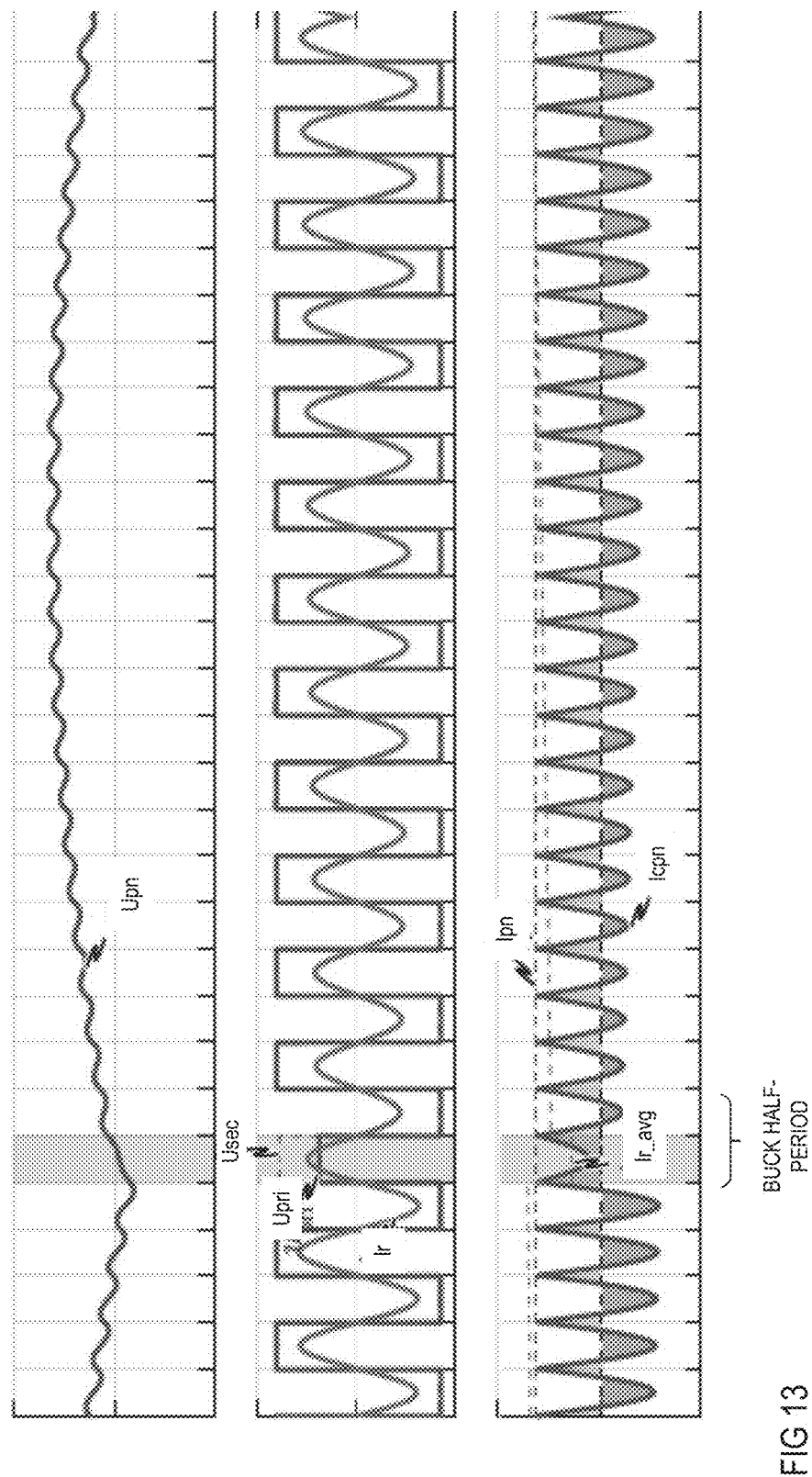
FIG. 13 shows signal diagrams of the method shown in FIG. 11 over a longer time period.

FIG. 13 shows signal waveforms of voltages and currents occurring in the SR converter 12 over a longer time period. The signal diagrams shown in FIG. 13 are based on an example in which a difference between the DC link voltage Upn and the output voltage Uo is much smaller than in the example illustrated in FIG. 9A. In the example illustrated in FIG. 13, the average resonant current Ir_avg falls below the DC link current during the buck-half period and increases very slowly in the next few SR half-periods wherein the slow increase is due to the small voltage difference between DC link voltage Upn and the output voltage Uo. As a result, the DC link voltage Upn continues to increase until the average resonant current Ir_avg is larger than the DC link current Ipn. In the example illustrated in FIG. 9A, the voltage difference between Upn and Uo is large enough for the average resonant current Ir_avg to become higher than the DC link current Ipn already in the second half-period of the buck period, so that the DC link voltage starts to decrease in the buck period or shortly after the buck period.

Basically, in the buck mode, there are time periods (buck half-periods) in which the resonant tank 4 receives less energy from the first power converter 11 and the DC link capacitor circuit 13 than in the SR mode, so that the DC link voltage Upn increases during the buck periods. Basically, this is achieved by modulating the amplitude of the primary voltage Upri such that there are time periods in which the amplitude is lower than the magnitude of the DC link voltage Upn. Inserting zero voltage pulses or voltage pulses with a reduced amplitude are just two examples for modulating the amplitude. Another example is explained with reference to FIG. 16 herein further below.

Boost Mode of the SR Converter

Figure 14:
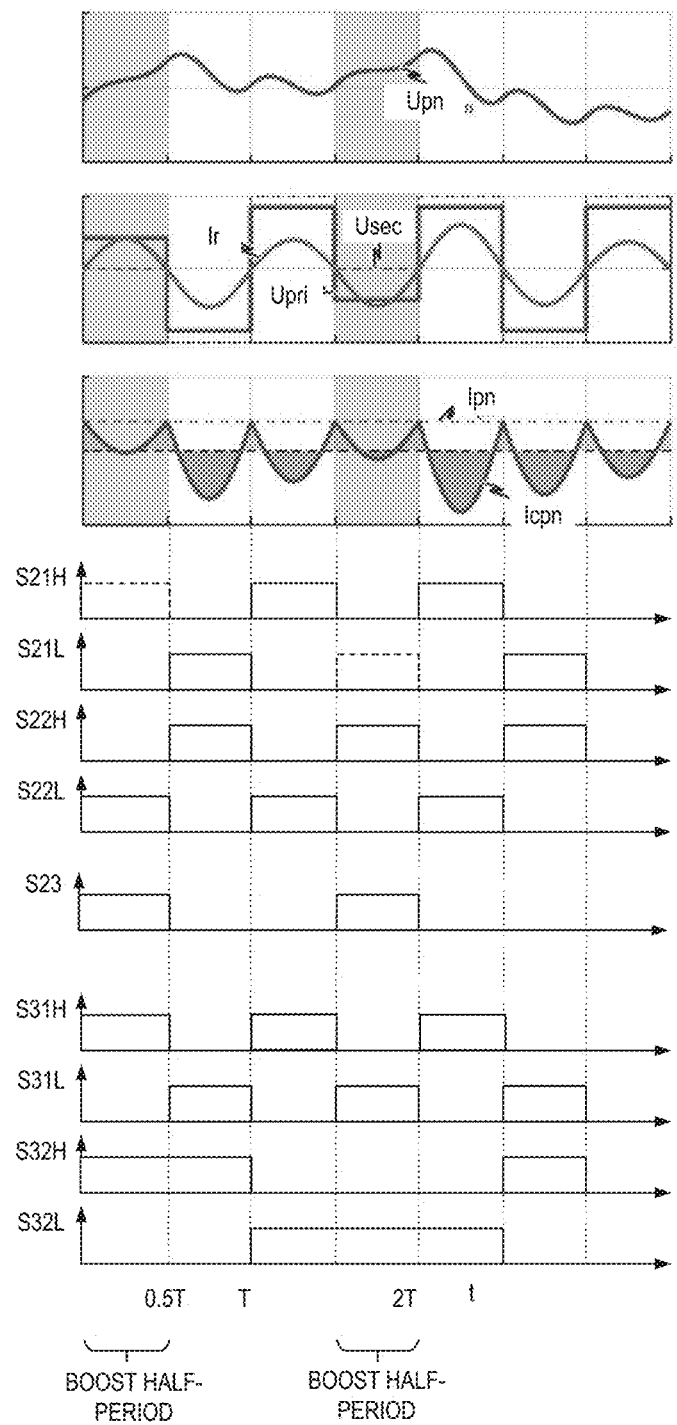
FIG. 14 illustrates one example of operating the second power converter in a third operating mode (boost mode)

Each of the SR converters shown in FIGS. 5 and 10 can also be operated in a boost mode. One example of operating an SR converter 12 of the type shown in FIG. 10 in the boost mode is illustrated in FIG. 14, wherein FIG. 14 illustrates signal waveforms of the DC link voltage Upn, the primary voltage Upri, the secondary voltage Usec, the resonant current Ir, the DC link current Ipn, and the DC link capacitor current Icpn as well as drive signals S21H-S22L, S31H-S32L of the switches 21H-22L, 31H-32L in the first bridge circuit 2 and the second bridge circuit 3.

Operating the PFC converter 12 in the boost mode is different from operating the PFC converter 12 in the SR mode in that boost half-periods occur. In a boost half-period, the secondary side taps 31T, 32T of the first and second secondary side half-bridges 31, 32 are short circuited (shorted) for a certain time period. This has the effect that more energy is stored in the resonant inductor 42 (and subsequently transferred to the output x, y) than in those time periods in which the secondary side taps 31T, 32T are coupled to the output x, y. In this way, the output voltage Uo can be increased relative to the DC link voltage Upn. Short circuiting the output nodes $45_1$, $45_2$ of the resonant circuit 4 from time to time is equivalent to modulating an amplitude of the secondary voltage Usec.

Optionally, in those time periods in which the secondary side taps 31T, 32T are shorted, the primary voltage Upri is generated with a reduced amplitude different from zero. For the purpose of illustration, FIG. 14 shows two boost half-periods, wherein in a first one of these boost half-periods, the secondary side taps 31T, 32T are shorted during a half-period in which a positive voltage pulse is applied to the input $44_1$, $44_2$ of the resonant circuit 4. In this example, the positive voltage pulse has a reduced amplitude, which can be achieved in the same way as explained with reference to FIGS. 11, 12A and 12B before (by switching on the T-leg switch 23 and the low-side switch 22L of the second primary side half-bridge 22). In a second boost half-period illustrated in FIG. 14, the secondary side taps 31T, 32T are shorted during a half-period in which a negative voltage pulse is applied to the resonant tank 4 on the primary side. In this example, the negative pulse is a pulse with a reduced amplitude, wherein this pulse with the reduced amplitude can be generated in the same way as explained with reference to FIGS. 11, 12A and 12B herein before (by switching on the T-leg switch 23 and the high-side switch of the second primary side half-bridge 22).

Applying voltage pulses with a reduced amplitude when the secondary side taps 31T, 32T are shorted, however, is only an example. According to another example, the primary side bridge circuit 2, in the boost mode, operates in the same way as in the SR mode. Thus, when the secondary side taps 31T, 32T are shorted either a positive voltage pulse or a negative voltage pulse having the magnitude of the DC link voltage Upn may be applied to the input of the resonant circuit 4. As explained before, a positive voltage pulse can be generated by switching on the low-side switch 22L of the second primary side half-bridge 22 and the high-side switch 21H of the first primary side half-bridge 21 (as illustrated by the drive signal S21H drawn in dashed lines in FIG. 14), and a negative voltage pulse can be generated by switching on the high-side switch 22H of the second primary side half-bridge 22 and the low-side switch 21L of the first primary side half-bridge 21 (as illustrated by the drive signal S21L drawn in dashed lines in FIG. 14).

Basically, the relationship between the output voltage Uo and the DC link voltage Upn can be adjusted by suitably selecting the duration of the short periods within the boost half-periods and the ratio between the number of boost periods and the number of normal periods (SR periods) within a given time period. Basically, the longer the short periods are and the more of the boost half-periods occur in a certain time period, the higher the output voltage Uo becomes relative to the DC link voltage Upn. Furthermore, the effect of short circuiting the secondary side taps 31T, 32T can be "softened" by reducing the amplitude of the primary voltage Upri during the short periods. By combining reduced amplitudes of the primary voltage Upri with short periods on the secondary side a better control of the output voltage Uo relative to the DC link voltage Upn can be achieved.

Figure 15A:
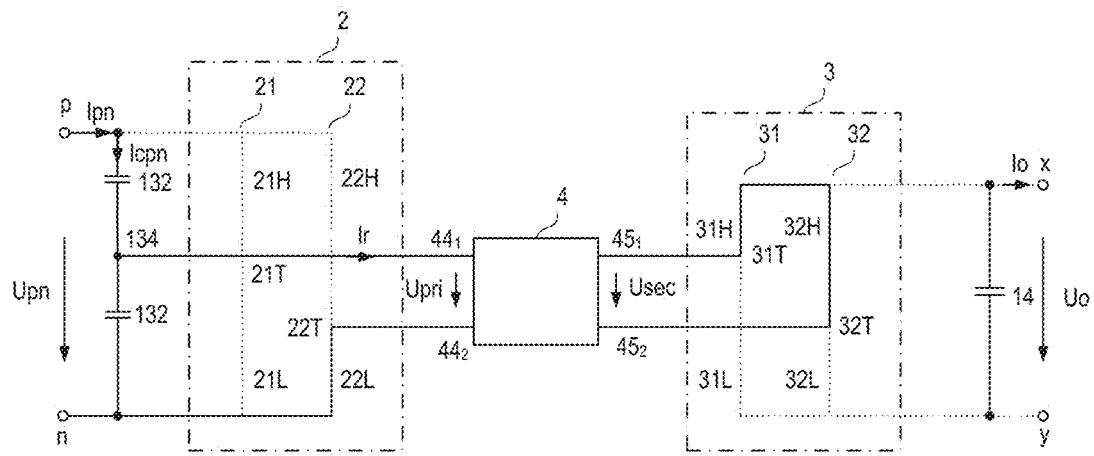
FIGS. 15A and 15B illustrate current paths in the SRC according to FIG. 10 in certain time periods of the method according to FIG. 14.
Figure 15B:
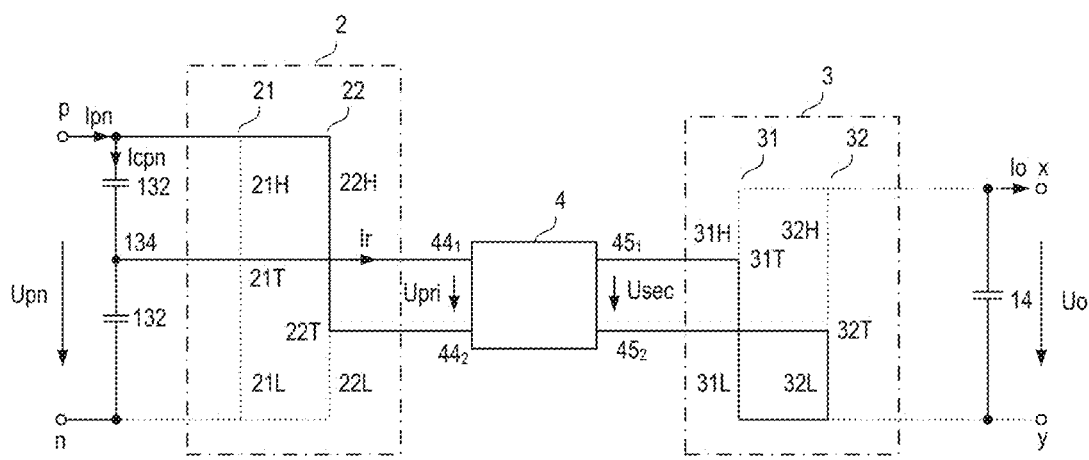

The secondary side taps 31T, 32T can be shorted either by switching on at the same time the high-side switches 31H, 32H of the secondary side half-bridges 31, 32 or by switching on at the same time the low-side switches 31L, 32L of the secondary side half-bridges 31, 32. This is illustrated in FIGS. 15A and 15B. FIG. 15A illustrates the switching state of the primary side bridge circuit 2 and the secondary side bridge circuit 3 in a time period in which the secondary side taps 31T, 32T are shorted and a positive voltage pulse with a reduced amplitude is applied to the resonant circuit 4. FIG. 15B illustrates the switching state of the primary side bridge circuit 2 and the secondary side bridge circuit 3 in a time period in which the secondary side taps 31T, 32T are shorted and a negative voltage pulse with a reduced amplitude is applied to the resonant circuit 4 on the primary side.

Duty Cycle Operation

In the examples of operating the SR converter 12 in the buck mode explained herein before, in the buck half-periods, the primary voltage Upri is generated with a reduced amplitude for a duration that equals the duration of the respective buck half-period. Equivalently, in the examples of operating the SR converter 12 in the boost mode explained herein before, in the boost periods, the time period in which the secondary side taps 31T, 32T are shorted equals the time period of the respective boost half-period. This, however, is only an example. It is also possible in the buck mode, to generate a reduced amplitude of the primary voltage Upri for less than the duration of one half-period, and in the boost mode to short the secondary side taps 31T, 32T for less than the duration of one drive half-period. This is illustrated in FIG. 16, wherein FIG. 16 illustrates signal diagrams of the DC link voltage Upn, the primary side voltage Upri, the secondary side voltage Usec, the resonant current Ir, the DC link current Ipn, the DC link capacitor current Icpn in the buck mode.

In this example, in one buck period the primary voltage Upri has a reduced amplitude for a time period which is less than the duration of the buck half-period. The duration, for which the amplitude of the primary voltage Upri is reduced can be modulated in order to regulate the relationship between the output voltage Uo and the DC link voltage Upn. This type of operation can be referred to as duty cycle buck mode operation. The duty cycle may be defined as a ratio between a duration of the time period in which the primary voltage Upri has a reduced amplitude and an overall duration T of the buck half-period. According to one example, the duty cycle varies between 0 and 1, wherein a duty cycle of 1 corresponds to the examples explained with reference to FIGS. 9A to 9C and 11 herein before. The reduced amplitude may be zero, as explained with reference to FIGS. 9A to 9C, or 50% of the DC link voltage Upn, as explained with reference to FIG. 11.

Figure 16:
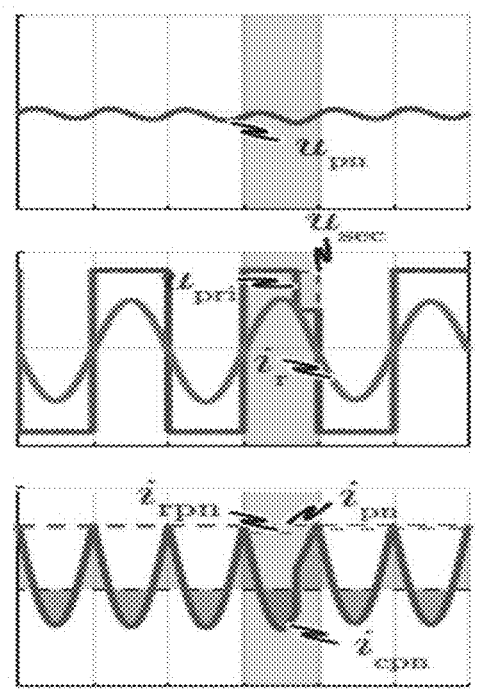
FIG. 16 illustrates a modification of the method according to FIG. 11.

A duty cycle operation as illustrated in FIG. 16 is not limited to the buck mode. According to one example, operating the SR converter 12 in the boost mode includes operating the SR converter 12 in a duty cycle boost mode.

In this case, time periods in which the secondary side taps 31T, 32T are shorted, are less than the duration of one half-period.

Figure 17:
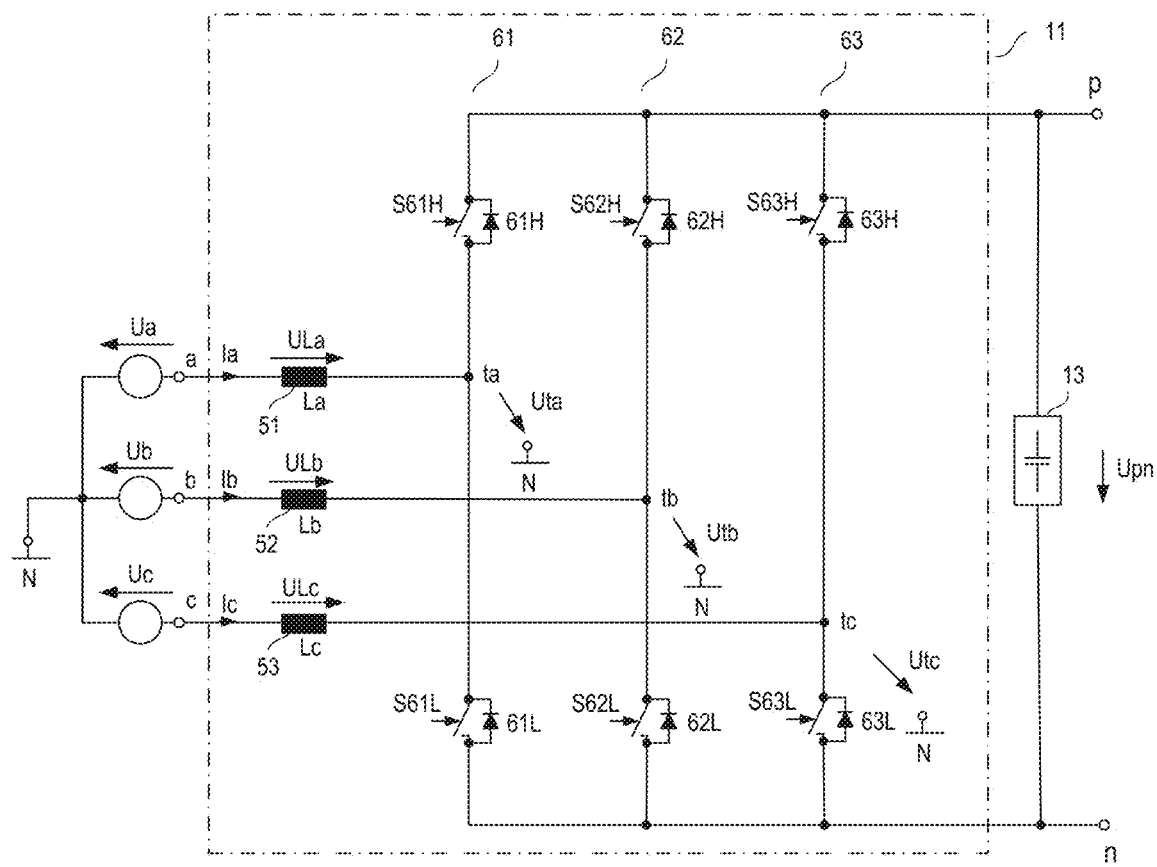
FIG. 17 illustrates a circuit diagram of one example of the first power converter implemented as a PFC converter.

FIG. 17 illustrates one example of the PFC converter 11. In this example, the PFC converter 11 includes three inductors La, Lb, Lc each coupled to a respective one of the three input nodes a, b, c. In the example illustrated, the inductors La, Lb, Lc are directly coupled to the inputs a, b, c. This, however is only an example. According to another example (not shown) an input filter is connected between the inputs a, b, c and the inductors La, Lb, Lc.

Referring to FIG. 17, the PFC converter further includes a rectifier bridge with three bridge legs 61, 62, 63. Each of the three bridge legs 61, 62, 63 includes a half-bridge with a high-side switch 61H, 62H, 63H, a low-side switch 61L, 62L, 63L. The high-side switch 61H, 62H, 63H and the low-side switch 61L, 62L, 63L of each of the half-bridges are connected in series between the DC link nodes p, n. Further, each of the half-bridges includes a tap ta, tb, tc, which is a circuit node between the high-side switch 61H, 62H, 63H and the low-side switch 61L, 62L, 63L of the respective half-bridge. Each of the taps ta, tb, tc is connected to a respective one of the inductors La, Lb, Lc, that is, tap ta of a first one of the half-bridges is connected to a first one La of the inductors La, Lb, Lc, tap tb of a second one of the half-bridges is connected to a second one Lb of the inductors La, Lb, Lc, and tap tc of a third one of the half-bridges is connected to a third one Lc of the inductors La, Lb, Lc. A rectifier bridge of the type illustrated in FIG. 17 is known as B6 bridge.

In the example illustrated in FIG. 17, a freewheeling element, such as a diode, is connected in parallel with each of the high-side switches 61H, 62H, 63H and the low-side switches 61H, 62H, 63H. A switch and a corresponding freewheeling element may be implemented as explained with reference to FIG. 6.

Operating a PFC converter of the type shown in FIG. 17 may include (a) regulating the DC link voltage Upn such that it has a predefined voltage level, and (b) regulating each of the three input currents Ia, Ib, Ic such that a shape of the respective current waveform essentially equals the shape of the voltage waveform of the respective input voltage Ua, Ub, Uc. Thus, when the input voltages Ua, Ub, Uc are sinusoidal voltages, the input currents Ia, Ib, Ic are regulated such that they essentially have sinusoidal waveforms. Regulating each of the input currents Ia, Ib, Ic may include regulating an inductor voltage Ula, Ulb, Ulc across the respective inductor La, Lb, Lc, wherein this may include regulating voltages Uta, Utb, Utc at the taps ta, tb, tc between the inductors La, Lb, Lc and the bridge legs 61, 62, 63. In the following, the taps ta, tb, tc are also referred to as switch nodes ta, tb, tc of the bridge legs 61, 62, 63, and the voltages Uta, Utb, Utc at these switch nodes ta, tb, tc, are also referred to as switch node voltages. The switch node voltages Uta, Utb, Utc are referenced to the common ground node N.

Referring to the above, controlling the current Ia, Ib, Ic through each of the inductors La, Lb, Lc includes controlling the voltage Ula, Ulb, Ulc across the respective inductor La, Lb, Lc. Each inductor voltage Ula, Ulb, Ulc is given by the respective input voltage Ua, Ub, Uc minus the respective switch node voltage Uta, Utb, Utc. The input voltages Ua, Ub, Uc are predefined by a voltage source such as a power grid and can be measured, so that the inductor voltages Ula, Ulb, Ulc and, therefore, the inductor currents Ia, Ib, Ic can be regulated by regulating the switch node voltages Uta, Utb, Utc. This is explained in the following.

For the purpose of explanation it is assumed that the power converter is in a steady state in which the DC link voltage Upn has already reached a desired voltage level. According to one example, the PFC converter operates in a continuous conduction mode (CCM), so that the inductor currents Ia, Ib, Ic do not decrease to zero throughout each of the positive and the negative halfwave of the respective input voltage Ua, Ub, Uc. (The input currents Ia, Ib, Ic turn zero only for a short time period when the respective input voltage Ua, Ub, Uc crosses zero).

Current flow directions of the inductor currents Ia, Ib, Ic are dependent on instantaneous voltage levels of the input voltages Ua, Ub, Uc and are regulated such that each inductor current Ia, Ib, Ic is positive during the positive halfwave of the respective input voltage Ua, Ub, Uc and negative during the negative halfwave of the respective input voltage Ua, Ub, Uc.

Controlling the input currents Ia, Ib, Ic is explained in the following with reference to controlling the current Ia through the first inductors La. This current Ia is referred to as first input current in the following. Regulating the other two Ib, Ic of the input currents Ia, Ib, Ic is achieved in the same way. In the following the input a coupled to the first bridge leg 61 is referred to as first input, the voltage Ua received at this input a is referred to as first input voltage, the switch node ta of the first bridge leg 61 is referred to as first switch node, and the voltage Ula across the first inductor La is referred to as first inductor voltage Ula.

The first inductor voltage Ula is given by $$Ula = La \cdot \frac{dIa}{dt},$$

where La denotes the inductance of the first inductor La and dIa/dt denotes the time derivative of the first inductor current Ia. The inductor current Ia increases when the inductor voltage Ula is positive, decreases when the inductor voltage Ula is negative, and remains constant when the inductor voltage Ula is zero. By suitably switching the switch node voltage Uta at the first switch node ta between the electrical potentials at the DC link nodes p, n the first input current Ia can be controlled such that it has a desired waveform, such as a sinusoidal waveform. In the steady state, and in some modulation methods, an electrical potential Up at the first DC link node p is +0.5·Upn relative to the common ground node N, and an electrical potential Un at the second DC link node n is −0.5·Upn relative to the common ground node N. Thus, the first switch node voltage Uta essentially equals +0.5·Upn when the high-side switch 61H connected to the first switch node ta is switched on (and a voltage drop across the high-side switch 61H is negligible) and essentially equals −0.5·Upn when the low-side switch 61L connected to the first switch node ta is switched on (and a voltage drop across the low-side switch 61L is negligible).

Figure 18:
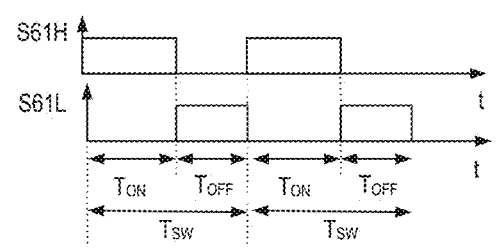
FIG. 18 illustrates signal diagrams of drive signals of switches in one bridge leg of a first power converter of the type illustrated in FIG. 17.

According to one example, the high-side switch 61H and the low-side switch 61L are operated in a PWM fashion at a fixed switching frequency $f_{SW}$, wherein in each drive cycle of a duration $T_{SW}$ (=1/$f_{SW}$) the high-side switch 61H is switched on for a first time period $T_{ON}$ and switched off for a second time period $T_{OFF}$ and the low-side switch 61L is switched off for the first time period $T_{ON}$ and switched on for the second time period $T_{OFF}$, wherein $T_{ON}+T_{OFF}=T_{SW}$. This is illustrated in FIG. 18 which shows signal diagrams of the drive signals S61H, S61L of the high-side switch 61H and the low-side switch 61L in two successive drive cycles.

The average of the first inductor current Ia increases, when the average of the inductor voltage Ula over one drive period $T_{SW}$ of the high-side switch 61H and the low-side switch 61L is positive, decreases when the average of the inductor voltage Ula over one drive period of the high-side switch 61H and the low-side switch 61L is negative, and remains constant when the average of the inductor voltage Ula over one drive period of the high-side switch 61H and the low-side switch 61L is zero.

The switching frequency $f_{SW}$ is significantly higher than the frequency of the first input voltage Ua. The switching frequency $f_{SW}$ is between several kHz and several 10 kHz and may range up to several 100 kHz, for example. In order to adjust the first switch node voltage Uta duty cycles of operating the high-side switch 61H and the low-side switch 61L vary. In the following, d61H denotes the duty cycle of the high-side switch 61H, and d61L denotes the duty cycle of the low-side switch 61L. These duty cycles are given by $$d61H = \frac{T_{ON}}{T_{SW}} \quad (5a)$$

$$d61L = \frac{T_{OFF}}{T_{SW}} = \frac{T_{SW} - T_{ON}}{T_{SW}} = 1 - d61H. \quad (5b)$$

By suitably adjusting these duty cycles d61H, d61L the first switch node voltage Uta can be adjusted, wherein it can be shown that the first switch node voltage Uta is given by:

$$Uta = 0.5 \cdot Upn \cdot d61H - 0.5 \cdot Upn \cdot d61L = (d61H - 0.5) \cdot Upn \quad (6).$$

Thus, by suitably adjusting the duty cycle d61H of the high-side switch 61H (and the duty cycle d61L of the low-side switch 61L), the first switch node voltage Uta and, therefore, the first inductor voltage Ula can be adjusted. On the other hand, based on the desired first switch node voltage Uta and the DC link voltage Upn the duty cycle d61H can be calculated as follows:

$$d61H = \frac{0.5 \cdot Upn + Uta}{Upn}. \quad (7)$$

One example of a method for regulating the inductor voltages Ula, Ulb, Ulc such that the input currents Ia, Ib, Ic are essentially proportional to the input voltages Ua, Ub, Uc is explained in the following. Referring to the above, this may include operating the switches 61H-63L of the bridge legs 61, 62, 63 in a pulsewidth-modulated (PWM) fashion by the control circuit 15 (which is not illustrated in FIG. 17), wherein the high-side switch 61H, 62H, 63H and the low-side switch 61L, 62L, 63L of one bridge leg 61, 62, 63 are operated in complementary fashion so that only one of the high-side switch 61H, 62H, 63H and the low-side switch 61L, 62L, 63L of one bridge leg 61, 62, 63 is switched on at the same time. Further, in order to avoid cross currents, there may be a dead time between switching off one of the high-side switch 61H, 62H, 63H and the low-side switch 61L, 62L, 63L in one bridge leg 61, 62, 63 and switching on the other one of the high-side switch 61H, 62H, 63H and the low-side switch 61L, 62L, 63L in one bridge leg 61, 62, 63, wherein during the dead time the freewheeling element of one of the high-side switch 61H, 62H, 63H and the low-side switch takes over the current. (The freewheeling element of the high-side switch takes over the current whenever the respective input current is positive and the freewheeling element of the low-side switch takes over the current whenever the respective input current is negative.)

Figure 19A:
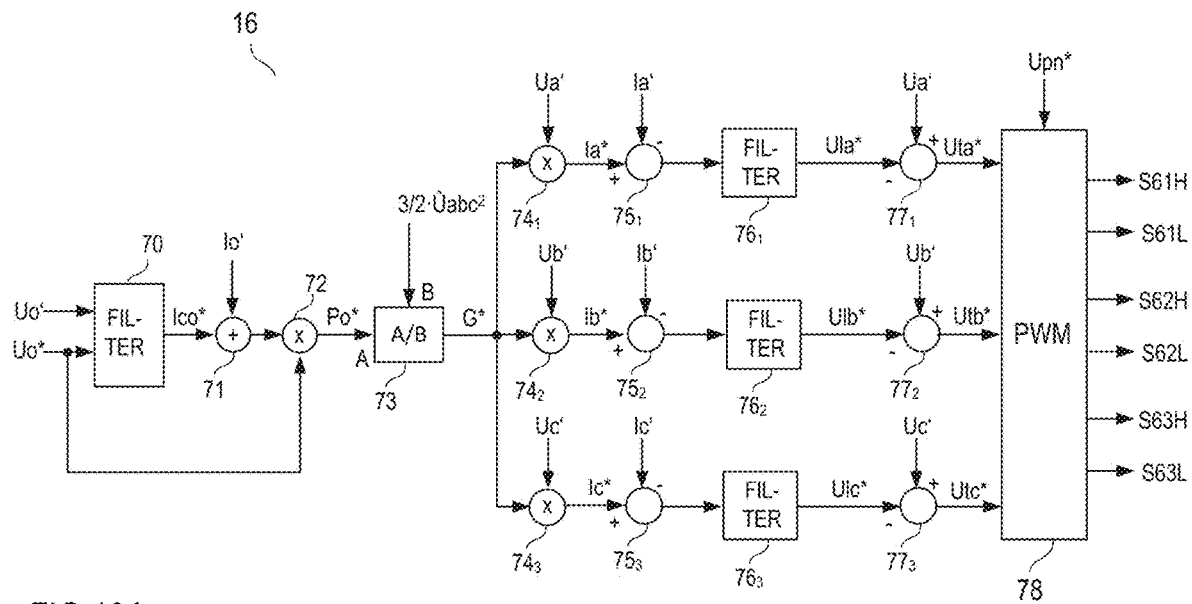
FIG. 19A illustrates one example of a control circuit configured to control operation of the first power converter illustrated in FIG. 17.

Operating the PFC converter 11 shown in FIG. 17 is explained with reference to FIG. 19A in the following, wherein FIG. 19A schematically illustrates one example of a PFC control circuit 16. The PFC control circuit is part of the control circuit 15 (see FIG. 1) and is configured to drive the switches 61H-63L in the bridge legs 61-63 by generating the drive signals S61-S63. It should be noted that the block diagram shown in FIG. 19A illustrates the functional blocks of the PFC control circuit 16 rather than a specific implementation. Those functional blocks can be implemented in various ways. According to one example, these functional blocks are implemented using dedicated circuitry. According to another example, the control circuit 4 is implemented using hardware and software. For example, the first control circuit includes a microcontroller and software executed by the microcontroller.

Referring to FIG. 19A, the PFC control circuit 16 receives an output voltage signal Uo', wherein the output voltage signal Uo' represents the output voltage Uo. The output voltage Uo may be measured in a conventional way by any kind of voltage measurement circuit (not shown) in order to obtain the output voltage signal Uo'. The PFC control circuit 16 includes a first filter 70 that receives the output voltage signal Uo' and the output voltage reference Uo* that represents the desired voltage level of the output voltage Uo. The first filter 70 subtracts the output voltage reference Uo* from the output voltage signal Uo', for example, and filters the difference in order to generate an output signal Ico*. According to one example, this output signal Ico* represents a desired current into the output capacitor 14 (see, FIG. 1). The first filter 70 may have one of a proportional (P) characteristic, a proportional-integrative (PI) characteristic, a proportional-integrative-derivative (PID) characteristic, or the like. According to one example, the first filter 70 has a PI characteristic. This filter may also be referred to as PI controller.

An adder 71 receives the filter output signal Ico* and an output current signal Io' that represents the output current Io. The output current Io may be measured in a conventional way by any kind of current measurement circuit (not shown) in order to obtain the output current signal Io'. An output signal of the adder 71 represents the desired current Ico into the output capacitor 14 plus the output current Io and is received by a multiplier 72. The multiplier 72 further receives the output voltage reference Uo* and provides a multiplier output signal Po*, wherein this multiplier output signal Po* represents a desired output power of the SR converter 12 that is required to regulate the output voltage Uo such that is essentially equals the output voltage reference Uo*. The multiplier output signal Po*, which is also referred to output power reference Po* in the following, also represents an average input power of the PFC converter 11 over one period of the input voltage system Ua, Ub, Uc. An instantaneous input power received at each of the three input nodes a, b, c of the PFC converter 11, however, varies due to the alternating nature of the input voltages Ua, Ub, Uc.

Referring to FIG. 19A, a divider 73 divides the multiplier output signal Po* by a signal $3/2 \cdot \hat{U}abc^2$ that represents 1.5 times (3/2 times) the square of the amplitude $\hat{U}abc$ of the input voltages Ua, Ub, Uc. An output signal G* of the divider 73 represents an overall desired conductance of the PFC power converter 11, wherein the overall desired conductance G* is the conductance that is required by the power converter arrangement in order to achieve the desired input power Po*.

Referring to FIG. 19A, the PFC control circuit 16 further includes three branches, wherein each of these branches receives the divider output signal G* and generates a respective switch node voltage reference Uta*, Utb*, Utc*. Each of these switch node voltage references Uta*, Utb*, Utc* defines a desired voltage level of a respective one of the switch node voltages Uta, Utb, Utc. A PWM modulator 78 receives the switch node voltage references Uta*, Utb*, Utc* and a DC link voltage reference Upn* and generates the drive signals S61H-S63L based on the switch node voltage references Uta*, Utb*, Utc* and a DC link voltage reference Upn* such that the switch node voltages Uta, Utb, Utc essentially equal the respective switch node voltage references Uta*, Utb*, Utc*. When the PFC converter is implemented with a B6 topology as illustrated in FIG. 17 the duty cycles d61H, d62H, d63H of the switches 61H-63L in the bridge legs may be calculated by the PWM modulator based on equation (7) as follows:

$$d61H = \frac{0.5 \cdot Upn^* + Uta^*}{Upn^*} \quad (8a)$$

$$d62H = \frac{0.5 \cdot Upn^* + Utb^*}{Upn^*} \quad (8b)$$

$$d63H = \frac{0.5 \cdot Upn^* + Utc^*}{Upn^*}. \quad (8c)$$

This, however, is only an example. In another type of PFC converter such as, for example, a PFC converter with a Vienna rectifier topology explained herein further below duty cycles of switches may be calculated in a different way. In each case, however, switch node voltages Uta, Utb, Utc are suitably adjusted by operating a bridge circuit such that these switch node voltage are in correspondence with switch node voltage references Uta*, Utb*, Utc*.

Referring to FIG. 19A, each of the three branches that receive the divider output signal G* includes a respective multiplier $74_1$, $74_2$, $74_3$ that multiplies the divider output signal G* with a respective input voltage signal Ua', Ub', Uc'. Each of these input voltage signals Ua', Ub', Uc' represents a respective one of the input voltage Ua, Ub, Uc and can be obtained by measuring the input voltages Ua, Ub, Uc. Output signals Ia*, Ib*, Ic* of these multipliers $74_1$, $74_2$, $74_3$ are input current reference signals that is, each of these signals Ia*, Ib*, Ic* represents the desired current level of a respective one of the input currents Ia, Ib, Ic. From each of these input current reference signals Ia*, Ib*, Ic* a respective input current signal Ia', Ib', Ic' is subtracted by a respective subtractor $75_1$, $75_2$, $75_3$ connected downstream the respective multiplier $74_1$, $74_2$, $74_3$. Each of these input current signals Ia', Ib', Ic' represents a respective one of the instantaneous input currents Ia, Ib, Ic and can be obtained by measuring the input currents Ia, Ib, Ic.

Referring to FIG. 19A, the output signal of each of the subtractors $75_1$, $75_2$, $75_3$ is filtered by a respective filter $76_1$, $76_2$, $76_3$ connected downstream the respective subtractor $75_1$, $75_2$, $75_3$. An output signal Ula*, Ulb*, Ulc* of each filter $76_1$, $76_2$, $76_3$ represents a desired voltage level of a respective one of the three inductor voltages Ula, Ulb, Ulc. The filters $76_1$, $76_2$, $76_3$ may have one of a proportional (P) characteristic, a proportional-integrative (PI) characteristic, a proportional-integrative-derivative (PID) characteristic, or the like.

Further, referring to FIG. 19A, a further subtractor 771, 772, 773 subtracts, from each of the input voltage signals Ua', Ub', Uc' the respective inductor voltage reference signals Ula*, Ulb*, Ulc* in order to obtain the switch node voltage references Uta*, Utb*, Utc* received by the PWM modulator 78.

In the controller 16 illustrated in FIG. 19A, the desired output power Po* is calculated based on the output voltage reference Uo*, the output voltage signal Uo' that represents the instantaneous output voltage Uo and the output current signal Io' that represents the instantaneous output current Io.

A controller 16 of the type illustrated in FIG. 19A may further be used when it is desired that the power converter regulates the output voltage Uo provided to the load Z, that is, when the output voltage Uo is not defined by the load Z.

Figure 19B:
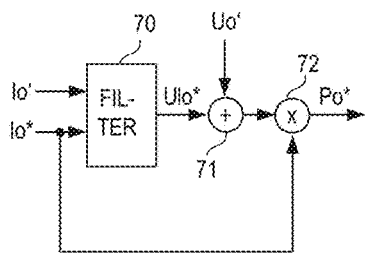
FIG. 19B illustrates a modification of one section of the control circuit shown in FIG. 19A.

According to another example illustrated in FIG. 19B, the output power reference Po* is calculated based on an output current reference Io* of the power converter arrangement 1. This output current reference Io* may be provided by a load Z. The load Z, for example, may include a battery so that the output current reference Io* represents a desired charging current of the battery.

In the example illustrated in FIG. 19B, the first filter 70 receives the output current reference Io* and an output current signal Io' that represents the output current Io. The output current Io may be measured in a conventional way by any kind of current measurement circuit (not shown) in order to obtain the output current signal Io'. The first filter 70 subtracts the output current reference Io* from the output current signal Io', for example, and filters the difference in order to generate an output signal Ulo*. According to one example, this output signal Ulo* represents a desired voltage across the output inductor 17 (see, FIG. 1), which may be used in this case. The first filter 70 may have one of a proportional (P) characteristic, a proportional-integrative (PI) characteristic, a proportional-integrative-derivative (PID) characteristic, or the like.

Referring to FIG. 19B, the adder 71 receives the filter output signal Ulo* and an output voltage signal Uo' that represents the output voltage Uo. The output voltage Uo may be measured in a conventional way by any kind of current measurement circuit (not shown) in order to obtain the output voltage signal Uo'. An output signal of the adder 71 represents the desired voltage across the output inductor 17 plus the output voltage Uo and is received by the multiplier 72. In the example according to FIG. 19B, the multiplier 72 further receives the output current reference Io* and provides the output power reference Po*. This output power reference Po* may be further processed in the same way as illustrated in FIG. 19A.

Figure 20:
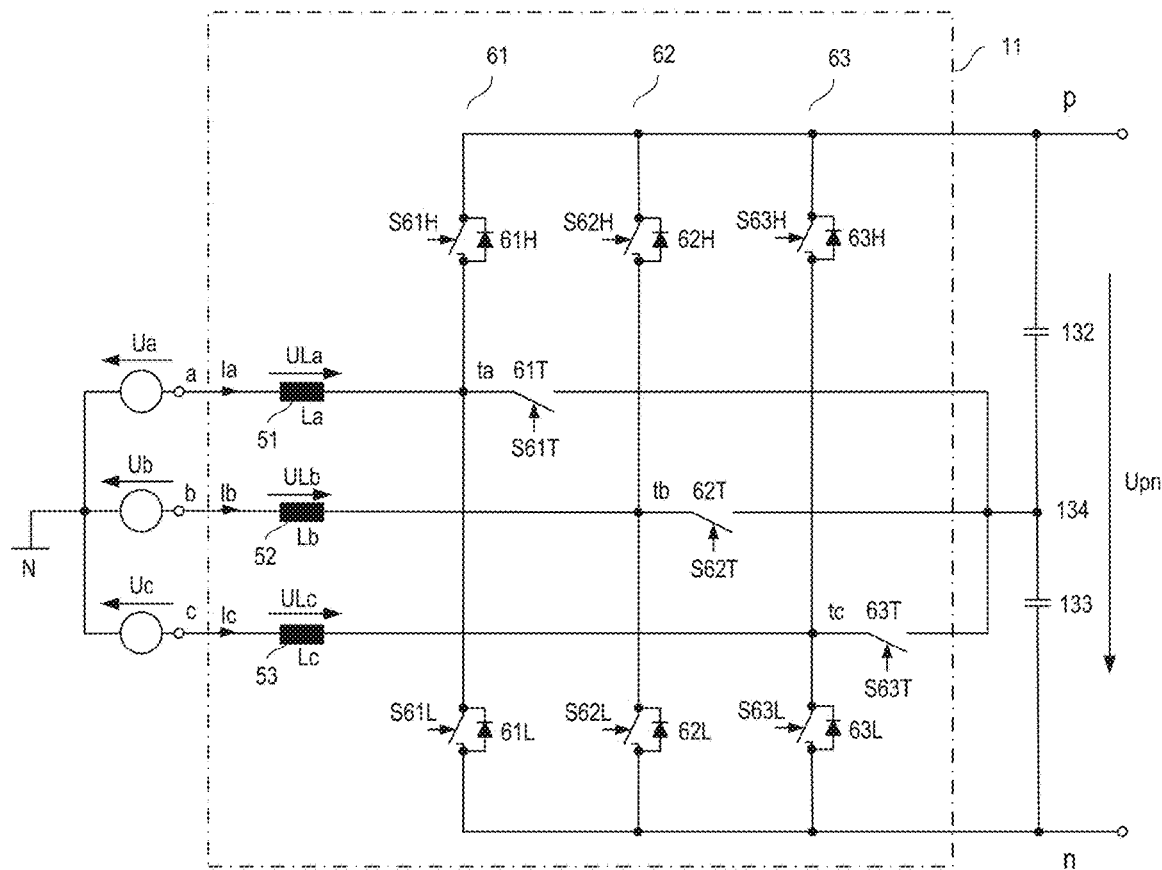
FIG. 20 illustrates a circuit diagram of another example of the first power converter implemented as a PFC converter.

As mentioned above, the PFC converter 11 is not restricted to be implemented with a B6 topology. FIG. 20 illustrates a PFC converter according to another example. In this example, the PFC converter 11 includes a rectifier with a Vienna rectifier topology, wherein the DC link capacitor circuit 13 is implemented as illustrated in FIG. 3B and includes a first DC link capacitor 132 and a second DC link capacitor 133. The Vienna rectifier illustrated in FIG. 20 is different from the B6 topology shown in FIG. 17 in that each bridge leg includes a switch 61T, 62T, 63T between a respective switch node ta, tb, tc and the tap 134 of the DC link capacitor circuit 13. The high-side switches 61H, 62H, 63H and the low-side switches 61L, 62L, 63L of the half-bridges may be replaced by passive rectifier elements (diodes) having the same polarity as the rectifier elements illustrated in FIG. 20, or the high-side switches 61H, 62H, 63H and the low-side switches 61L, 62L, 63L may be operated as synchronous rectifiers.

In the Vienna rectifier, the switch node voltages Uta, Utb, Utc are adjusted by a PWM operation of the switches 61T, 61T, 63T, wherein during off-periods of the switches 61T, 62T, 63T the switch nodes ta, tb, tc, dependent on directions of the input currents Ia, Ib, Ic, are either clamped to the potential at the first DC link node p or the potential at the second DC link node n.

In each case, in order to achieve sinusoidal current waveforms of the input currents Ia, Ib, Ic, the DC link voltage Upn may be regulated such that it is equal to or higher than the maximum line-to-line voltage Ull_max explained above.

The PFC converter 11 can be operated in three different operating modes, which may be referred to as 3/3 mode, 2/3 mode, and 1/3 mode and are explained in the following.

3/3 Operating Mode of the PFC Converter

In the 3/3 mode, the at least one switch in each bridge leg of the PFC converter 11 is operated in a PWM mode as explained with reference to FIGS. 18 and 19. In this operating mode, the PFC converter 11 is capable of regulating the input currents Ia, Ib, Ic such that each of these currents is essentially proportional to the respective input voltage Ua, Ub, Uc. Further, in this operating mode, the PFC converter 11 is capable of regulating the input power received by the PFC converter 11 such that the input power essentially equals an output power reference Po*, wherein the output power reference Po* may be obtained based on an output voltage reference Uo*, as illustrated in FIG. 19A, or may be obtained based on an output current reference Io*, as illustrated in FIG. 19B. In the 3/3 mode, however, relatively high switching losses may occur because the at least one switch in each of the three bridge legs is operated in a PWM fashion.

1/3 Operating Mode of the PFC Converter

Figure 21:
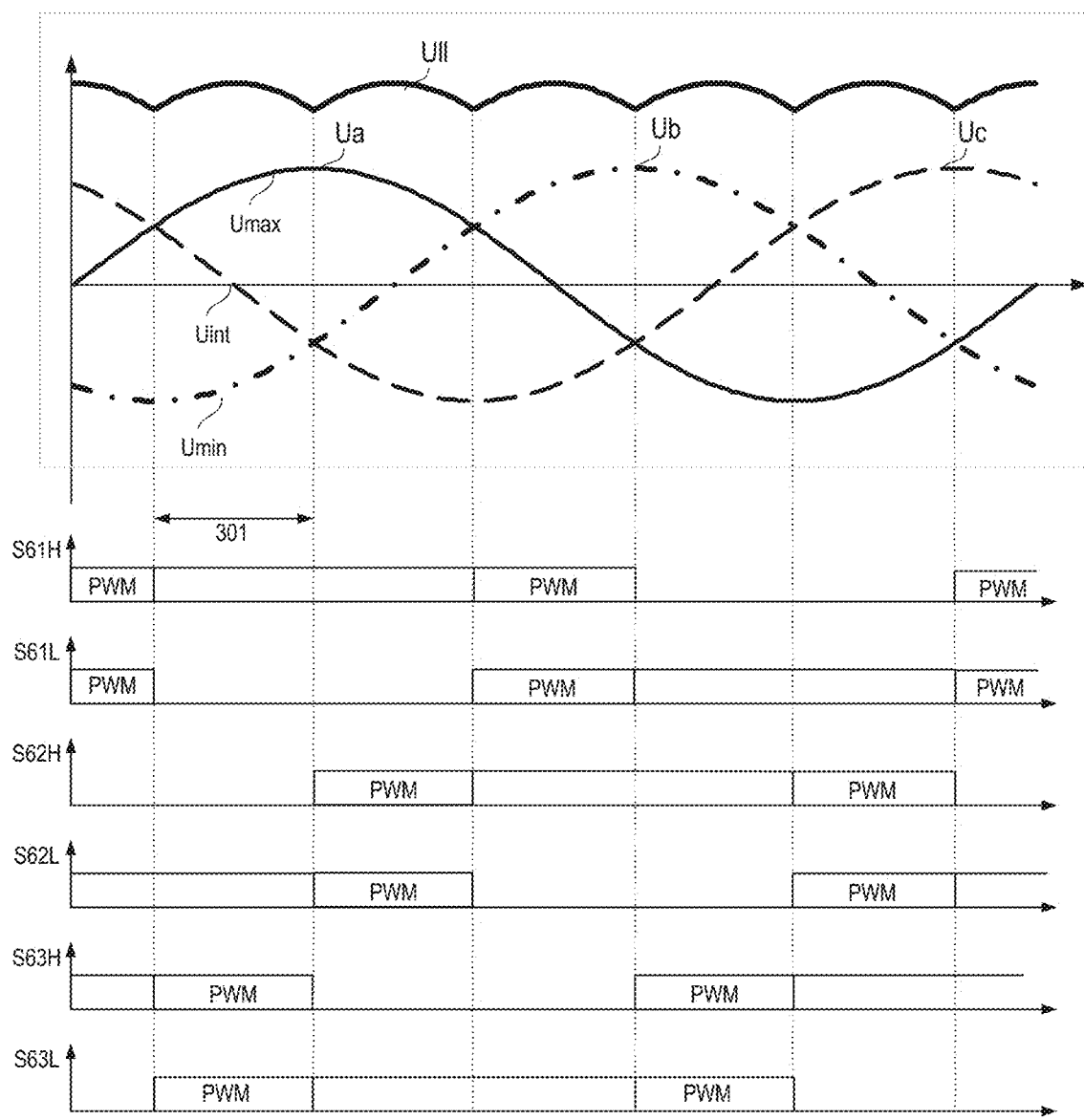
FIG. 21 illustrates one example for operating the first power converter in a 1/3 mode.

The switching losses in the PFC converter 11 can be reduced when operating the PFC converter in the 1/3 mode. In this operating mode, the at least one switch in only one of the three bridge legs is operated in the PWM mode at the same time and the at least one switch in the other two bridge legs is either switched on or switched off. In a PFC converter 11 of the type illustrated in FIG. 17, for example, operating the PFC converter 11 in the 1/3 mode may include operating the high-side switch and the low-side switch of one of the bridge legs 61, 62, 63 in the PWM mode, and permanently switching on one of the high-side switch and the low side switch and permanently switching off the other one of high-side switch and the low side switch in the other two bridge legs. This is illustrated in FIG. 21 that shows signal diagrams of the input voltages Ua, Ub, Uc, the line-to-line voltage Ull and the drive signals S61H-SS63L over one period of the input voltage system.

Referring to the above, in each period of the line-to-line voltage Ull (a) one of the three input voltages Ua, Ub, Uc is a maximum input voltage Umax, which is a voltage that is higher than the other two input voltages; (b) one of the three input voltages Ua, Ub, Uc is a minimum input voltage Umin, which is a voltage that is lower than the other two input voltages; and (c) one of the three input voltages Ua, Ub, Uc is an intermediate input voltage Uint, which is a voltage that is between the maximum input voltage and the minimum input voltage. In a period 301 of the line-to-line voltage Ull, for example, the first input voltage Ua is the maximum input voltage, the second input voltage Ub is the minimum input voltage, and the third input voltage is the intermediate input voltage.

According to one example, operating the PFC converter in the 1/3 mode includes operating the bridge leg that receives the intermediate input voltage in the PWM fashion and statically operating the bridge legs that receive the maximum input voltage and the minimum input voltage. Referring to FIG. 21, in the PFC converter 11 according to FIG. 17, (i) statically operating the bridge leg that receives the maximum input voltage Umax includes switching on the high-side switch of the respective bridge leg and switching off the low-side switch of the respective bridge leg, and (ii) statically operating the bridge leg that receives the minimum input voltage Umin includes switching off the high-side switch of the respective bridge leg and switching on the low-side switch of the respective bridge leg. Thus, in period 301 of the line-to-line voltage Ull, for example, the high-side switch 61H of the first bridge leg 61 and the low-side switch 62L of the second bridge leg 62 are switched on throughout the period 301, the low-side switch 61L of the first bridge leg 61 and the high-side switch 62H of the second bridge leg 62 are switched off throughout the period 301, and the high-side switch 63H and the low-side switch 63L of the third bridge leg 63 are operated in a PWM fashion throughout the period 301.

According to one example, statically operating the bridge legs that receive the maximum input voltage Umax and the minimum input voltage Umin may include switching off both the high-side switch and the low-side switch, so that the respective input current flows through freewheeling elements in the respective bridge legs.

According to one example, the PWM modulator 78 explained with reference to FIG. 19A selects the bridge leg that is to be operated in the PWM mode and the bridge legs that are to be operated statically dependent on the switch node voltage references Uta*, Utb*, Utc*. It can be assumed that the inductor voltages Ula, Ulb, Ulc are low as compared to the input voltages Ua, Ub, Uc so that based on the switch node voltage references Uta*, Utb*, Utc* it can be detected which of the bridge legs 61, 63, 63 currently receives the maximum input voltage Umax, the minimum input voltage Umin, and the intermediate input voltage Uint, respectively. That is, (a) one of the switch node voltage references Uta*, Utb*, Utc* is a maximum switch node voltage reference Utmax*, which is a switch node voltage reference that is higher than the other two of the switch node voltage references Uta*, Utb*, Utc*, and the PWM modulator 78 operates the bridge leg associated with the maximum switch node voltage reference Utmax* statically; (b) one of the switch node voltage references Uta*, Utb*, Utc* is a minimum switch node voltage reference Utmin*, which is a switch node voltage reference that is lower than the other two of the switch node voltage references Uta*, Utb*, Utc*, and the PWM modulator 78 operates the bridge leg associated with the minimum switch node voltage reference Utmin* statically; and (c) one of the switch node voltage references Uta*, Utb*, Utc* is an intermediate switch node voltage reference Utint*, which is a switch node voltage reference that is between the maximum switch node voltage reference Utmax* and the minimum switch node voltage reference Utmin*, and the PWM modulator 78 operates the bridge leg associated with the intermediate switch node voltage reference Utint* in the PWM mode.

Operating the PFC converter 11 in the 1/3 mode is one example of operating the PFC converter in a reduced switching mode, which is an operating mode in which less than the three bridge legs are operated in a PWM mode.

2/3 Operating Mode of the PFC Converter

The 2/3 mode is another example of operating the PFC converter 11 in a reduced switching mode. In the 2/3 mode, two of the three bridge legs 61, 62, 63 are operated in the PWM mode and one of the three bridge legs 61, 62, 63 is operated statically. Basically, in PFC converters 11 of the type illustrated in FIGS. 17 and 20, the sum of the input currents Ia, Ib, Ic is zero, that is Ia+Ib+Ic=0. Thus, by regulating two of the three input currents Ia, Ib, Ic the third one of the three input currents Ia, Ib, Ic is automatically regulated. Thus, the PFC converter may be operated in such a way that at each time one of the three bridge legs 61, 62, 63 is operated statically. The bridge legs 61, 62, 63 may alternatingly be deactivated, each for a predefined time period.

Figure 22:
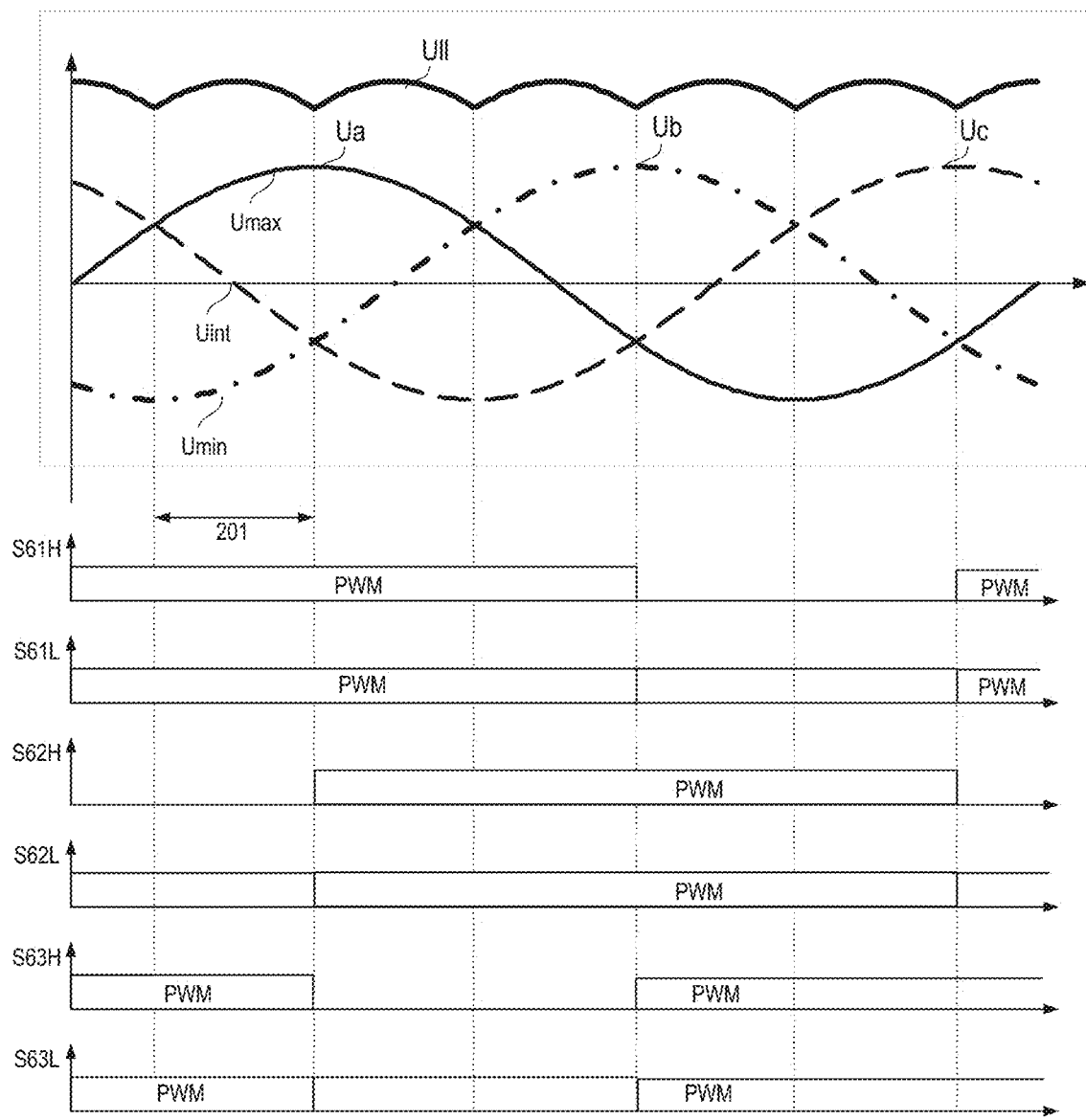
FIG. 22 illustrates one example for operating the first power converter in a 2/3 mode.

One example of operating a PFC converter 11 of the type shown in FIG. 17 in the 2/3 mode is illustrated in FIG. 22 that shows signal diagrams of the input voltages Ua, Ub, Uc, the line-to-line voltage Ull and the drive signals S61H-SS63L over one period of the input voltage system. In this example, the bridge leg that receives the minimum input voltage Umin is operated statically, while the other bridge legs are operated in the PWM mode. Operating a bridge leg statically in the 2/3 mode is identical with operating a bridge leg statically in the 1/3 mode explained above.

The method illustrated in FIG. 22 can be achieved by the PWM modulator 78 explained with reference to FIG. 19A in that the PWM modulator at each time operates the bridge leg associated with the minimum switch node voltage reference Utmin* statically.

In the method illustrated in FIG. 22, during one period of the input voltage system, each of the bridge legs is operated statically for a time period that equals two periods of the line-to-line voltage Ull. This, however, is only an example. Any other timing scheme may be used as well, wherein according to one example, overall time durations for which the bridge legs are operated statically in one period of the input voltage system are essentially the same.

Basically, the PFC converter 11 is only capable of drawing sinusoidal input currents Ia, Ib, Ic which are in phase with the input voltages Ua, Ub, Uc when the DC link voltage Upn is equal to or higher than a desired maximum switch node voltage Uttmax*, wherein the maximum switch node voltage Uttmax* is given by:

$$Ut\text{max}^* = Ut\text{max}^* - Ut\text{min}^* \tag{9}$$

wherein Utmax* denotes the maximum desired switch node voltage and Utmin* denotes the minimum desired switch node voltage explained above. Referring to the above, the voltages Ula, Ulb, Ulc across the inductors La, Lb, Lc are small as compared to the input voltages Ua, Ub, Uc. Thus, the maximum desired switch node voltage Uttmax*, which may also be referred to as maximum switch node voltage reference, approximately equals the line-to-line voltage Ull (Uttmax*∞Ull). In particular, the maximum switch node voltage reference Uttmax* varies over one period of the input voltage system Ua, Ub, Uc in the same way as the line-to-line voltage Ull.

In the 1/3 mode, the PFC converter 11 is not capable of regulating the waveforms of the input current Ia, Ib, Ic and the output power Po at the same time. According to one example, in the 1/3 mode of the PFC converter, the DC link voltage Upn is regulated by the SR converter 12 such that the DC link voltage Upn at least approximately equals the maximum desired switch node voltage Uttmax*. In this way, the desired waveforms of the input currents Ia, Ib, Ic can be achieved.

Figure 23:
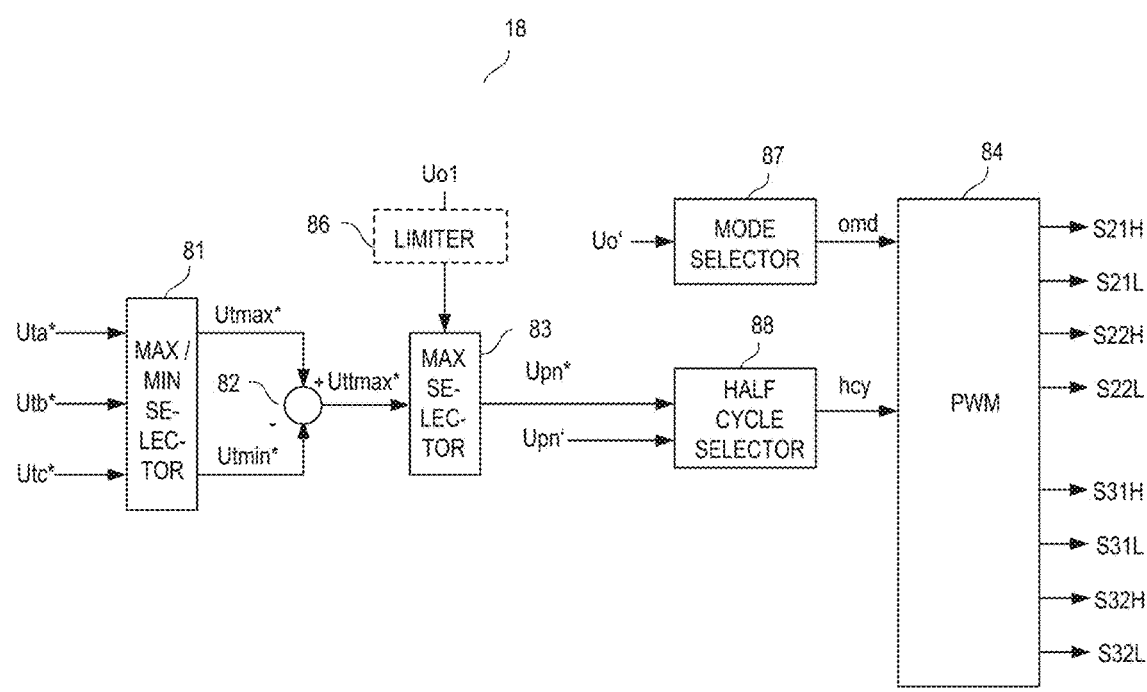
FIG. 23 illustrates one example of a controller of the SR converter.

One example of a controller 18 that is configured to control operation of the SR converter 12 is illustrated in FIG. 23. This controller 18 controls operation of the SR converter 12 by generating the drive signals S21H-S22L for the switches 21H-22L in the primary side bridge circuit 2 and by generating drive signals S31H-S32L for the switches 31H-32L in the secondary side bridge circuit 3.

Referring to FIG. 23, the controller 18 includes a maximum and minimum selector 81 that receives the desired switch node voltages Uta*, Utb*, Utc* from the controller of the PFC converter 11 (see, for example, the controller 16 shown in FIG. 19A). The maximum and minimum selector 81 is configured to select and output the maximum Utmax* of these switch node voltages Uta*, Utb*, Utc* and is configured to select and output the minimum Utmin* of these switch node voltages Uta*, Utb*, Utc*. A subtractor 82 receives the maximum switch node voltage Utmax* and the minimum switch node voltage Utmin* and calculates the maximum switch node voltage reference Uttmax* in accordance with equation (9) explained above.

A maximum selector 83 receives the maximum desired switch node voltage Uttmax* and an output signal Uo1 that is dependent on the output voltage Uo. According to one example, the output signal Uo1 is given by $$Uo1 = wr \cdot Uo' + Um \tag{10}$$

where Uo' is the output voltage signal that represents the output voltage Uo, n is the winding ratio of the transformer 41 in the resonant tank, and Um is an offset, wherein this offset is optional. A maximum of the maximum switch node voltage reference Uttmax* and the output signal Uo1 forms the DC link voltage reference Upn*, that is, Upn*=max{Uttmax*; Uo1}.

Referring to FIG. 23, the controller 18 further includes a mode selector 87 that the receives the measured output voltage and outputs an operating mode signal omd, wherein the operating mode signal omd indicates in which of the at least two operating modes the SR converter is to operate. Further, the controller 18 includes a half-period selector which receives the DC link voltage reference Upn* and the measured DC link voltage Upn'. The half-period selector 88 outputs a half-period signal hcy, wherein the half-period signal hcy indicates which type of half-period is to be generated by the controller 18. This is explained in detail herein below.

Referring to FIG. 19, a PWM modulator 84 receives the operating mode signal omd and the half-period signal hcy. The PWM modulator 84 is configured to generate the drive signals of the high-side switches 21H, 22H, 31H, 32H and the low switches 21L, 22L, 31L, 32L of the first and second bridge circuit 2, 3 dependent on the operating mode signal omd and the half-period signal hcy.

Operating Mode Selection in the PFC Converter

Referring to FIG. 19A and the corresponding description, the PWM modulator 78 of the PFC converter 11 receives the DC link voltage reference Upn* in order to calculate the duty cycles of the at least one switch in the PFC converter 11. According to one example, the PWM modulator 78 selects the operating mode of the PFC converter 11 dependent on the DC link voltage reference Upn* and the maximum switch node voltage reference Uttmax*, wherein the PWM modulator 78 may internally calculate the maximum switch node voltage reference Uttmax* based on the switch node voltage references Uta*, Utb*, Utc* or receive the maximum switch node voltage reference Uttmax* from the controller 18 of the SR converter 12.

According to one example, the PFC converter 11 operates in the 1/3 mode when the maximum switch node voltage reference Uttmax* equals the DC link voltage reference Upn*.

In the following, "the maximum switch node voltage reference Uttmax* being equal to the DC link voltage reference Upn*" includes that the maximum switch node voltage reference Uttmax* is equal to the DC link voltage reference Upn* or within a given range around the DC link voltage reference Upn*.

When the DC link voltage reference Upn* is higher than the maximum switch node voltage reference Uttmax* the PFC converter 11 either operates in the 2/3 mode or the 3/3 mode. According to one example, the PFC converter 11 operates in the 2/3 mode when the DC link voltage reference Upn* is higher than the maximum switch node voltage reference Uttmax*.

According to one example, the duty cycle of the at least one switch in the PFC converter 11 is calculated such that PFC "automatically" either operates in the 1/3 mode or the 2/3 mode. In this case, the duty cycles are calculated by the PWM modulator 7 based on the DC link voltage reference Upn* and the maximum switch node voltage reference Uttmax* as follows, $$d61H = \frac{Uta^*}{Upn^*} + dcm \qquad (11a)$$

$$d62H = \frac{Utb^*}{Upn^*} + dcm \qquad (11b)$$

$$d63H = \frac{Utc^*}{Upn^*} + dcm, \qquad (11c)$$

wherein dcm denotes a common mode duty cycle, which is given by, $$dcm = -\min\left\{\frac{Uta^*}{Upn^*}, \frac{Utb^*}{Upn^*}, \frac{Utc^*}{Upn^*}\right\}. \qquad (12)$$

Figure 24A:
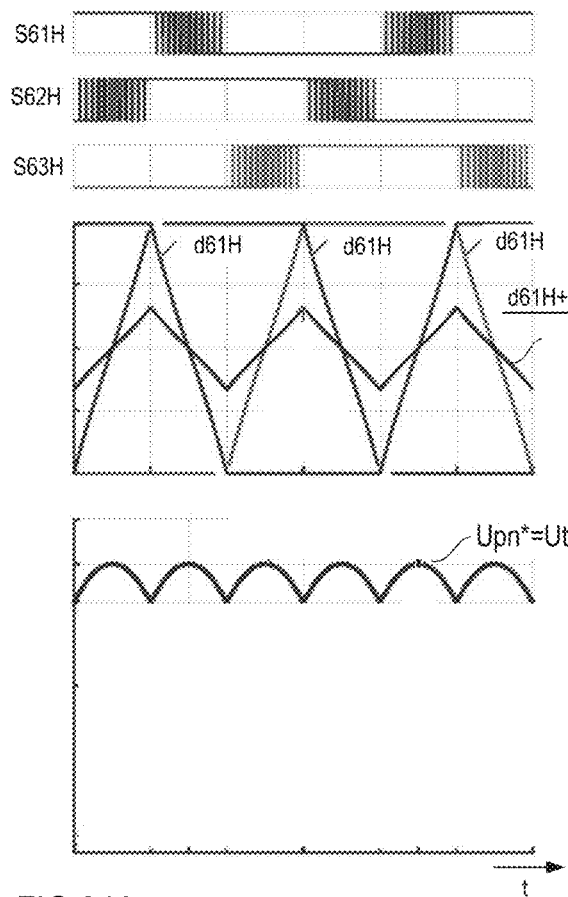
FIGS. 24A and 24B show signal diagrams that illustrate operating the PFC converter in 1/3 mode and 2/3 mode.
Figure 24B:
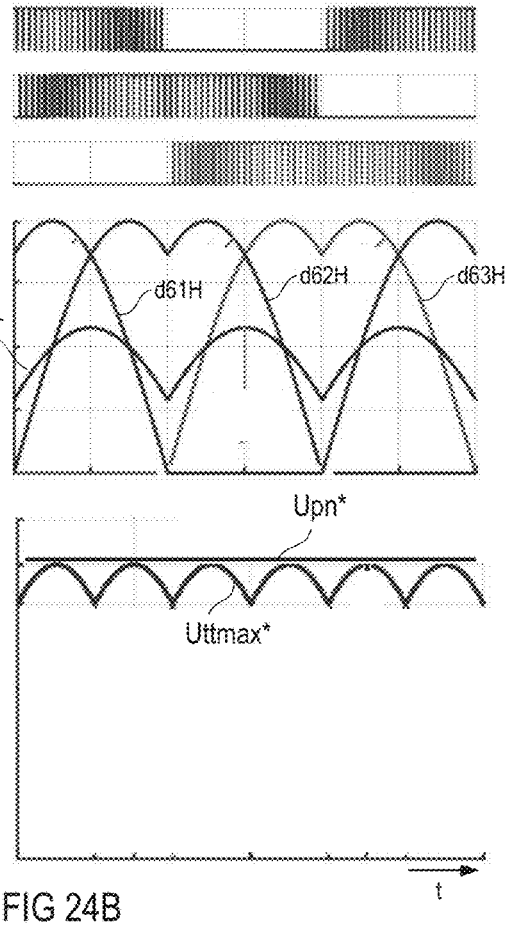

FIGS. 24A and 24B illustrate, one period of the input voltage system, duty cycles d61H, d62H, d63H calculated in this way, the corresponding drive signals S61H, S62H, S63H, and the DC link voltage reference. FIG. 24A illustrates an operating scenario in which the DC link voltage reference Upn* equals the maximum switch node voltage reference Uttmax*, so that the PFC converter 11 operates in 1/3 mode. FIG. 24B illustrates an operating scenario in which the DC link voltage reference Upn* equals the switch node voltage reference Uttmax*, so that the PFC converter 11 operates in 2/3 mode.

FIGS. 24A and 24B illustrate a pure 1/3 mode and a pure 2/3 mode, respectively. That is, in these examples the PFC converter 11 operates in the 1/3 mode or the 2/3 mode throughout the period of the input voltage system. It should be noted, however, that dependent on a relationship between the DC link voltage reference Upn* and the maximum switch node voltage reference Uttmax* PFC converter 11, within one period of the input voltage system, may operate both in 1/3 mode and in 2/3 mode. That is, in those time periods in which the DC link voltage reference Upn* equals the maximum switch node voltage reference Uttmax* the PFC converter operates in 1/3 mode and in other time periods in which the DC link node reference Upn* is higher than the maximum switch node voltage reference Uttmax* the PFC converter 11 operates in the 2/3 mode.

Operating Mode Selection in the SR Converter

According to one example, synergetic control of the PFC converter 11 and the SR converter 12 includes that in each operating mode of the PFC converter 11 the DC link voltage Upn is regulated by the SR converter 12. Referring to the above, the load Z may include a battery so that, in this case, the output voltage Uo may be defined by the load Z and the output power Po is regulated by the PFC converter 11.

SR Mode

According to one example, the SR converter 12 operates in the SR mode when the output voltage Uo, as represented by the output voltage signal Uo', is higher than a predefined first threshold Uth1. According to one example, the first threshold Uth1 is given by $$Uth1 \geq \frac{Ull\_max}{wr}, \qquad (13)$$

wherein wr is the winding ratio of the transformer 41 in the resonant tank 40 and Ull_max is the maximum line-to-line voltage as defined by the input voltage system Ua, Ub, Uc. According to one example, the first threshold Uth1 is proportional to $$\frac{Ull\_max}{wr},$$

$$Uth1 = u \cdot \frac{Ullmax}{wr}, \qquad (14a)$$

where Ull_max is the maximum line-to-line voltage, wr is the winding ratio, and u is a proportionality factor. According to one example, u is selected from between 1.01 and 1.2, in particular from between 1.01 and 1.05.

According to another example, the first threshold Uth1 is higher than $$\frac{Ullmax}{n}$$

by an offset v, $$Uth1 = \frac{Ullmax}{wr} + v. \qquad (14b)$$

According to one example, v is selected from between 3V and 20V, in particular from between 5V and 15V.

When the SR converter is in the SR mode, the DC link voltage Upn is essentially defined by the output voltage Uo. Selecting the first threshold Uth1 as defined by equation (9) ensures that, when the SR converter 12 is in the SR mode, the DC link voltage Upn is higher than the maximum line-to-line voltage Ull_max and, therefore, high enough for the PFC converter 11 to operate in the 2/3 or 3/3 mode.

In the controller according to FIG. 23, the mode selector 87 compares the measured output voltage Uo' with the first voltage threshold Uth1 and generates the operating mode signal omd dependent on this comparison, wherein the mode selector 87 generates the operating mode signal omd such that it indicates that the SR converter 12 is to be operated in the SR mode when the measured output voltage Uo' is higher than the first voltage threshold Uth1. The PWM modulator 84 receives the operating mode signal and, when the operating mode signal omd indicates that the SR converter 12 is to be operated in the SR mode, generates the drive signal S21H-S31L in accordance with FIGS. 8A to 8C and the corresponding description. According to one example, in the SR mode, the half-period signal hcy is not considered by the PWM modulator 84 in the generation of the drive signals S21H-S31L.

Buck Mode

According to one example, the SR converter 12 operates in the buck mode when the output voltage Uo is lower than the first threshold Uth1. Further, in the buck mode, the SR converter 12 is configured to regulate the DC link voltage Upn such that it essentially equals the DC link voltage reference Upn*.

Referring to the above, the DC link voltage reference Upn* is given by the maximum of the maximum switch node voltage reference Uttmax* and the output signal Uo1=wr·Uo'+Um (Upn*=max{Uttmax*; Uo1}), so that the SR converter 12 regulates the DC link voltage Upn (a) such that it equals the maximum switch node voltage reference Uttmax* as long as the maximum switch node voltage reference Uttmax* is higher than the output signal Uo1, and (b) such that it equals the output signal Uo1 when the output signal Uo1 is higher than the maximum switch node voltage reference Uttmax*. In the controller according to FIG. 23, the mode selector 87 compares the measured output voltage Uo' with the first voltage threshold Uth1 and generates the operating mode signal omd dependent on this comparison, wherein the mode selector 87 generates the operating mode signal omd such that it indicates that the SR converter 12 is to be operated in the buck mode when the measured output voltage Uo' is lower than the first voltage threshold Uth1.

The PWM modulator 84 receives the operating mode signal omd and, when the operating mode signal omd indicates that the SR converter 12 is to be operated in the buck mode, generates the drive signals S21H-S31L dependent on the half-period signal such that either a buck half-period or an SR half-period is generated. The half-period signal hcy is generated dependent on the DC link voltage reference Upn* and the measured DC link voltage Upn', wherein, according to one example, the half-period signal hcy is generated based on comparing the DC link node reference Upn* and the measured DC link voltage Upn'.

According to one example, the half-period selector 88 generates the half-period signal hcy only based on the DC link voltage reference Upn* and the measured DC link voltage Upn'. A half-period selector 88 of this type is illustrated in FIG. 25.

Figure 25:
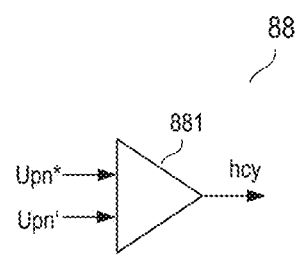
FIG. 25 illustrates one example of a half-period selector controller included in the controller of the SR converter.

The half-period selector 88 according to FIG. 25 includes a comparator 881 that receives the DC link voltage reference Upn* and the measured DC link voltage Upn' and outputs the half-period signal. This half-period signal hcy has a first signal, which is referred to as buck level in the following, when the measured DC link voltage Upn' is lower than the DC link voltage reference Upn*.

According to one example, in the buck mode, the PWM modulator 84 monitors the half-period signal hcy and generates a buck half-period when the half-period signal hcy has the buck level. Referring to the above, generating a buck half-period causes the DC link voltage Upn to increase, wherein one buck half-period or several buck half-periods may be required to cause the DC link voltage Upn to rise above the DC link voltage reference Upn*. When the measured DC link voltage Upn' indicates, in the buck mode, that the DC link voltage Upn is higher than the DC link voltage reference Upn* SR half-periods are generated by the PWM modulator until the DC link voltage Upn again falls below the DC link voltage reference Upn*. The PWM modulator 84 may generate the buck half-periods in accordance with any of the examples explained herein above.

Figure 26:
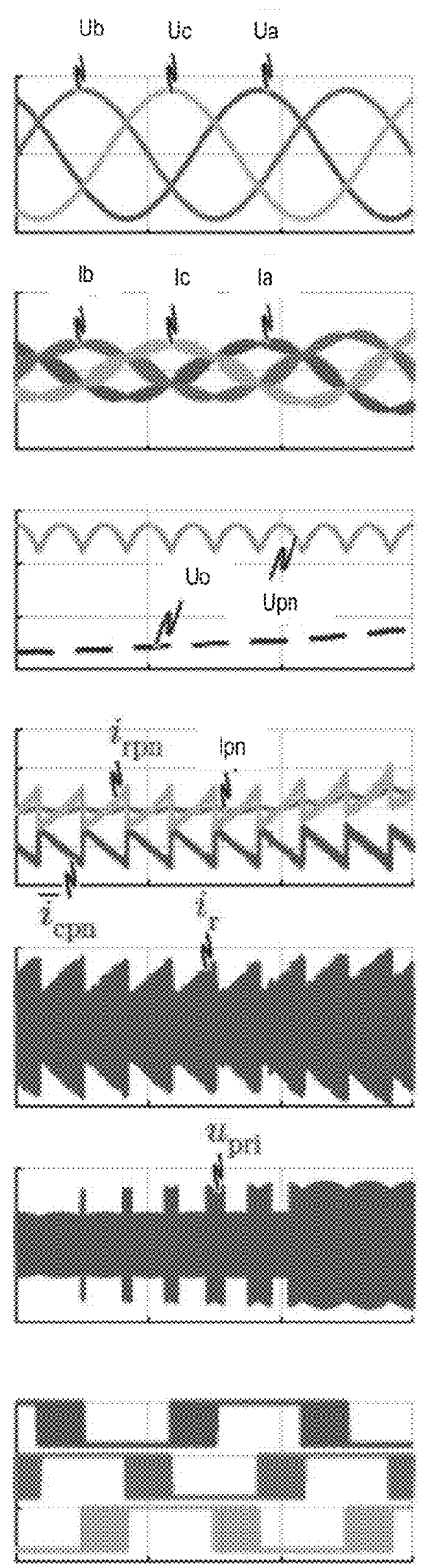
FIG. 26 illustrates operating the first power converter in the 1/3 mode and the second power converter in the buck mode.

FIG. 26 shows signal diagrams that illustrate operation of the power converter arrangement when the SR converter 12 is in the buck mode. Inter alia, FIG. 26 illustrates signal waveforms of the input voltages Ua, Ub, Uc, the input currents Ia, Ib, Ic, the DC link voltage Upn, the output voltage Uo, and drive signals S61H, S62H, S63H of the high-side switches 61H, 62H, 63H in the PFC converter 11. Just for the purpose of illustration, the signal diagrams illustrated in FIG. 26, as well as the signal diagrams illustrated in FIGS. 27 and 28 explained herein further below, illustrate operation of a power converter arrangement in which the winding ratio of the transformer in the SR converter 12 is wr=1.

The signal diagrams shown in FIG. 26 illustrate operating the power converter arrangement in a time period in which the output voltage Uo is so low that the DC link voltage reference Upn* is only governed by the maximum switch node voltage reference Uttmax*. That is, the output signal Uo1 is lower than the maximum switch node voltage reference Uttmax* in this operating mode. The SR converter 12 therefore generates the DC link voltage Upn based on the output voltage Uo such that it essentially equals the maximum switch node voltage reference Uttmax* which, as outlined above, essentially equals the maximum line-to-line voltage. Throughout the time period illustrated in FIG. 26, the PFC converter 11 operates in the 1/3 mode.

Figure 27:
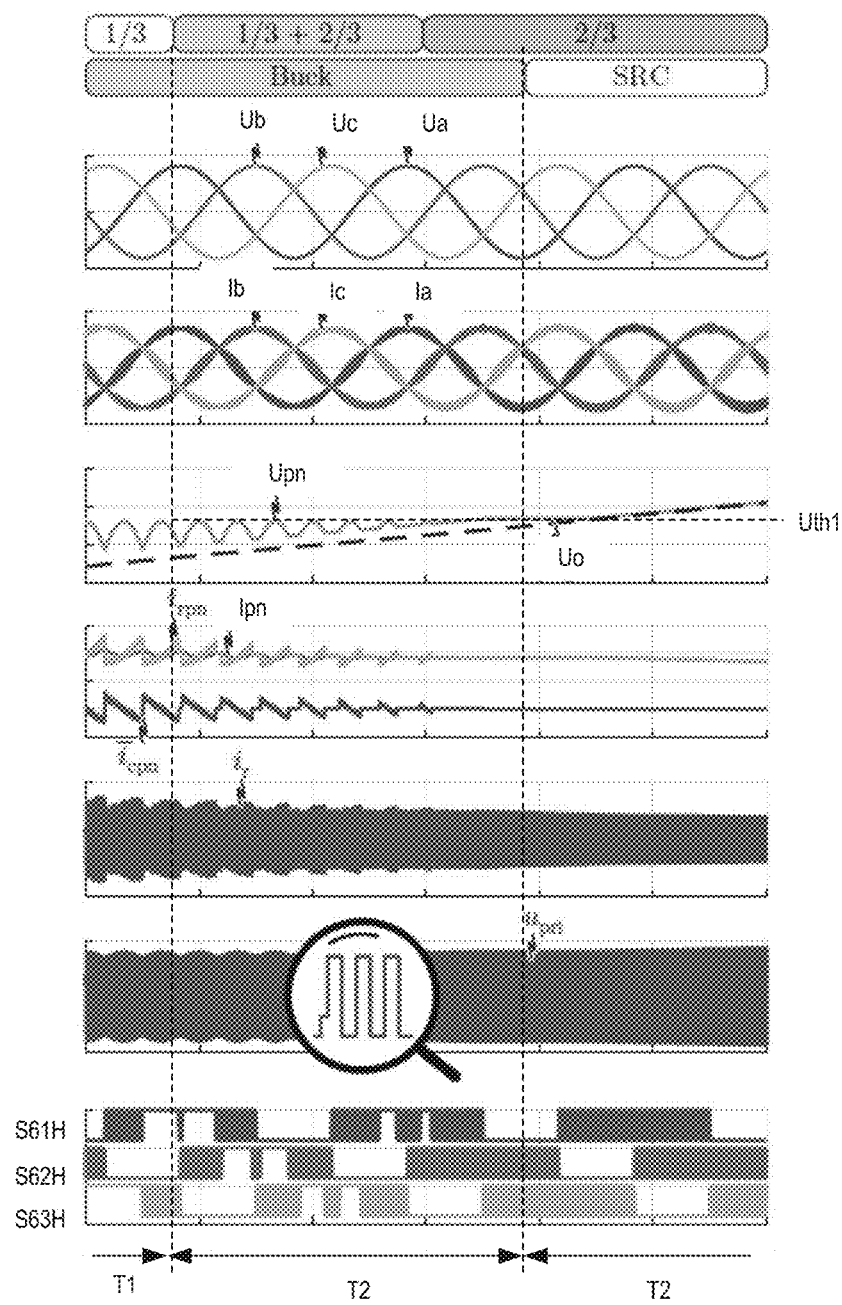
FIG. 27 illustrates operating the first power converter in the 1/3 mode or the 2/3 mode and operating the second power converter in one of the buck mode and the SR mode.

Referring to the above, the operating mode of the SR converter 12 is dependent on the output voltage Uo. FIG. 27 illustrates signal diagrams of the same signals as in FIG. 26 to illustrate different operating modes of the SR converter 12 and different operating modes of the PFC converter 11 dependent on the output voltage Uo. FIG. 27 is a schematic representation, wherein for the purpose of illustration it is assumed that the output voltage Uo significantly increases within several periods of the input voltage system Ua, Ub, Uc. In reality, it can be assumed that the output voltage Uo changes very slowly and is essentially constant over several periods of the input voltage system Ua, Ub, Uc.

In a first time period T1 illustrated in FIG. 27, the output voltage Uo is so low that the that the DC link voltage reference Upn* is only governed by the maximum switch node voltage reference Uttmax*. Thus, as already explained with reference to FIG. 25, the SR converter 12 generates the DC link voltage Upn based on the output voltage Uo such that it essentially equals the maximum switch node voltage reference Uttmax*. Furthermore, the PFC converter 11 operates in the 1/3 mode throughout this time period.

At the beginning of second time period T2 the output voltage Uo has reached a voltage level such that there are time periods throughout each period of the input voltage system Ua, Ub, Uc in which the output signal Uo1 is higher than the maximum switch node voltage reference Uttmax*. In these time periods, the DC link voltage reference Upn* is governed by the output signal Uo1 so that the SR converter 12 generates the DC link voltage UPN based on the output signal Uo1, and the PFC converter operates in the 2/3 mode (or may operate in the 3/3 mode, which is not illustrated in FIG. 26). In other time periods throughout each period of the input voltage system Ua, Ub, Uc the output signal Uo1 is lower than the maximum switch node voltage reference Uttmax* so that the DC link voltage reference Upn* is governed by the maximum switch node voltage reference Uttmax* and the PFC converter 11 operates in the 1/3 mode. As can be seen from FIG. 25, the duration of the time periods in which the PFC converter 11 operates in the 2/3 mode increases as the output voltage Uo increases. This is due to the fact that, when the output voltage Uo increases, the time periods in which the output signal Uo1 is larger than the (varying) maximum switch node voltage reference Uttmax* become longer.

Referring to the equation (9), the output signal Uo1 may include an offset portion Um that is different from zero. This offset portion, which may also be referred to as buck mode margin, ensures that Upn* is always larger than n·Uo as long as the SR converter is in the buck mode and so as to enable the SR converter 12 to operate in the buck mode. According to one example, Um is zero.

Referring to FIG. 27, at the beginning of a third time period, the output voltage Uo has reached the first threshold Uth1 so that the SR converter 12 starts to operate in the SR mode. According to one example, the first threshold Uth1 is selected such that the output signal Uo1 is higher than the maximum switch node voltage reference Uttmax* so that the SR converter 12 enters the SRC mode when the output voltage Uo has a voltage level which causes the PFC converter to only operate in the 2/3 mode (or the 3/3 mode). This may be achieved by selecting the first threshold in accordance with equation (9).

Boost Mode

Figure 28:
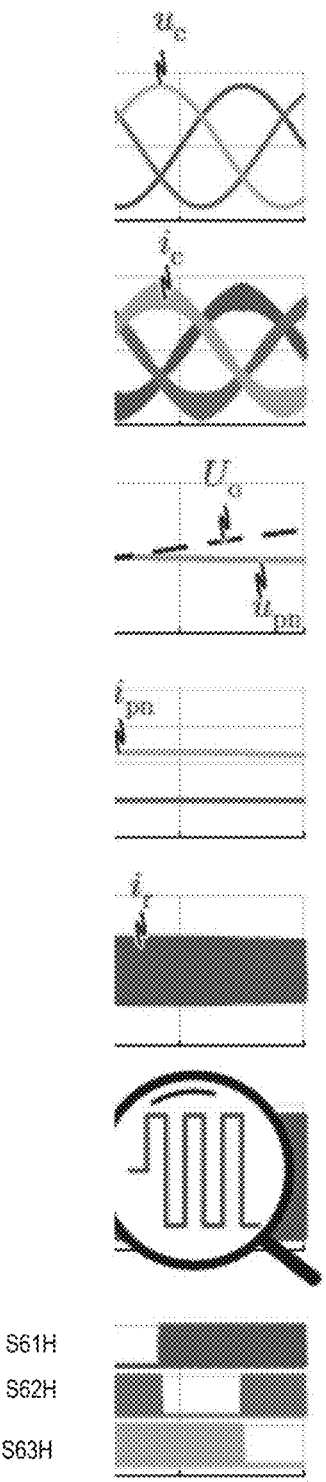
FIG. 28 illustrates operating the first power converter in the 2/3 mode and the second power converter in the boost mode.

According to one example illustrated in FIG. 28, the SR converter 12 enters the boost mode when the output voltage Uo reaches a predefined second threshold Uth2 that is higher than the first threshold. In the boost mode, the SR converter 12 regulates the DC link voltage Upn such that the DC link voltage Upn has a fixed voltage level Upnth2 that is independent of the output voltage Uo. According to one example this voltage level equals the voltage level the DC link voltage Upn has reached in the SR mode of the SR converter 12 right before the SR converter 12 enters the SR mode. Thus, according to one example Upnth2 is given by $$Upnth2=wr \cdot Uth2 \qquad (15).$$

The PFC converter 11 is in the 2/3 mode (or 3/3 mode) when the SR converter 12 is in the boost mode.

By fixing the DC link voltage Upn to Upnth2 the PFC converter 11 can be implemented with electronic switches that have a voltage blocking capability that is adapted to Upnth2, while the voltage blocking capability of the electronic switches in the SR converter 12 may be adapted to the output voltage Uo, which may be higher than the DC link voltage Upn. Thus, the PFC converter 11 may be implemented with electronic switches that have a lower voltage blocking capability than electronic switches in the SR converter 12. This may help to reduce costs of the overall power converter arrangement.

According to one example, the second threshold Uth2 is selected such that the fixed DC link voltage Upnth2 is between 60% and 80% of a voltage blocking capability of the devices in the PFC converter. According to one example, the devices in the PFC converter 11, such as switches S61H-S63H or S61H-S63L explained above, have a voltage blocking capability of about 1200 V and Upnth2 is selected from between 800V and 850V.

Operating the SR converter 12 in the boost mode is associated with limiting the DC link voltage reference Upn* to Upnth2. This may be achieved by a limiter 86 in the controller 18 illustrated in FIG. 23. This limiter 86 receives the output voltage signal Uo1 and limits the output voltage signal Uo1 to Upnth2.

The controller 18 according to FIG. 23 may be configured to operate the SR converter 12 in the boost mode. In this case, the mode selector 87 compares the measured output voltage Uo' with the second voltage threshold Uth2 and generates the operating mode signal omd such that it indicates that the SR converter 12 is to be operated in the boost mode when the measured output voltage Uo' is higher than the second voltage threshold Uth2.

Further, the PWM modulator 84 receives the operating mode signal omd and, when the operating mode signal omd indicates that the SR converter 12 is to be operated in the boost mode, generates the drive signals S21H-S31L dependent on the half-period signal such that either a boost half-period or an SR half-period is generated. The half-period signal hcy is generated dependent on the DC link voltage reference Upn* and the measured DC link voltage Upn', wherein, according to one example, the half-period signal hcy is generated based on comparing the DC link node reference Upn* and the measured DC link voltage Upn'.

According to one example, the half-period selector 88 is in accordance with FIG. 25, which generates the half-period signal hcy only based on the DC link voltage reference Upn* and the measured DC link voltage Upn'. In this case, the half-period signal hcy has a second signal level, which is referred to as boost level in the following, when the measured DC link voltage Upn' is higher than the (clamped) DC link voltage reference Upn*.

According to one example, in the boost mode, the PWM modulator 84 monitors the half-period signal hcy and generates a boost half-period when the half-period signal hcy has the boost level. Referring to FIG. 14, for example, generating a boost half-period may cause the DC link voltage Upn to increase because the resonant current Ir may decrease and the current Icpn into the DC link capacitor circuit 13 may increase. After such increase of the DC link voltage Upn, the DC link may decrease during the following SR half-periods.

A boost period is generated each time when the measured DC link voltage Upn' indicates, in the boost mode, that the DC link voltage Upn is lower than the DC link voltage reference Upn*. During this boost period, the resonant current Ir increases, but as the current taken from the DC link capacitor circuit 13 during the boost half period is relatively low, the DC link voltage Upn increases. During the next (few) SR half-periods, the DC link voltage Upn decreases due to the increased resonant current Ir, until the DC link voltage Upn again reaches Upn* and the next boost half-period is generated.

Although the present disclosure is not so limited, the following numbered examples demonstrate one or more aspects of the disclosure.

Example 1—A power conversion method, including: operating a PFC converter configured to receive three input voltages and provide a DC link voltage between DC link nodes in one of at least two different operating modes; and operating an SR converter coupled to the PFC converter via the DC link nodes in one of at least two different operating modes dependent on an output voltage of the SR converter, wherein operating the SR converter includes regulating a voltage level of the DC link voltage dependent on a DC link voltage reference, and wherein the at least two different operating modes of the SR converter include a buck mode and a series resonant mode.

Example 2—The method of example 1, wherein operating the SR converter in one of at least two different operating modes includes: operating the SR converter in the buck mode when the output voltage is lower than a first voltage threshold.

Example 3—The method of example 2, wherein the SR converter includes a transformer with a winding ratio wr between a number of windings np of a primary winding and a number of windings ns of a secondary winding, and wherein the first voltage threshold is given by $$Uth1 \geq \frac{Ull\_max}{wr},$$

where Ull_max is a maximum line-to-line voltage of the input voltage.

Example 4—The method of example 3, wherein $$Uth1 \geq \frac{Ull\_max}{wr} + v$$

where v is selected from between 0V and 20V.

Example 5—The method of any one of the preceding examples, wherein the SR converter includes a resonant circuit, and wherein operating the SR converter in each of the at least two different operating modes includes generating an alternating primary voltage received by the resonant circuit based on a DC link voltage available between the DC link nodes.

Example 6—The method of example 5, wherein the resonant circuit has a resonant frequency, and wherein a frequency of the primary voltage is between 9% and 110% of the resonant frequency.

Example 7—The method of example 5 or 6, wherein operating the SR converter in the buck mode includes modulating an amplitude of the primary voltage relative to a voltage level of the DC link voltage.

Example 8—The method of example 7, wherein modulating the amplitude of the primary voltage relative to the DC link voltage includes generating buck half-periods in which the primary voltage has a reduced amplitude that is lower than the DC link voltage for a predefined time duration.

Example 9—The method of example 8, wherein the reduced amplitude is zero.

Example 10—The method of example 8, wherein the reduced amplitude is between 40% and 60% of the DC link voltage.

Example 11—The method of any one of examples 8 to 10, wherein the predefined time duration is the duration of the respective half-period.

Example 12—The method of any one of examples 8 to 10, wherein the predefined time duration is less than the duration of the respective half-period.

Example 13—The method according to any one of examples 8 to 12, wherein the method includes generating a buck half-period dependent on a half-period signal, wherein a signal level of the half-period signal is dependent on the DC link voltage reference and the DC link voltage, and wherein a buck half-period is generated each time the half-period signal has a predefined first signal level.

Example 14—The method according to example 13, wherein the half-period signal is generated such that the half-period signal has the first signal level when the DC link voltage is below the DC link voltage reference.

Example 15—The method of any one of the preceding examples, wherein the at least two different operating modes of the PFC converter include a 1/3 mode and a 2/3 mode, and wherein operating the PFC converter in one of the at least two different operating modes includes operating the PFC converter in one of the at least two different operating modes dependent on the DC link voltage reference.

Example 16—The method of example 15, wherein operating the PFC converter includes regulating current waveforms of three input currents received by the PFC converter, wherein regulating the current waveforms of the three input currents include regulating switch node voltages of the PFC converter dependent on switch node voltage references, and wherein operating the PFC converter in one of the at least two different operating modes includes operating the PFC converter in one of the at least two different operating modes dependent on a relationship between the DC link voltage reference and a maximum switch node voltage reference.

Example 17—The method of example 16, wherein the PFC converter is operated in the 2/3 mode when the DC link voltage reference is higher than the maximum switch node voltage reference.

Example 18—The method of example 17, wherein the DC link voltage reference is selected to be the larger of the maximum switch node voltage reference and an output voltage value that is dependent on the output voltage.

Example 19—The method of any one of the preceding examples, wherein the at least two different operating modes of the SR converter further include a boost mode, and wherein the method further includes operating the SR converter in the boost mode when the output voltage is higher than a second threshold.

Example 20—The method of example 19, wherein operating the SR converter in the boost mode includes regulating the DC link voltage such that the DC link voltage has a fixed voltage level.

Example 21—The method of example 19 or 20, wherein the SR converter includes a resonant circuit, and wherein operating the SR converter in the boost mode includes modulating an amplitude of a secondary voltage provided by the resonant circuit.

Example 22—A power converter arrangement, including: a PFC converter configured to receive three input voltages and provide a DC link voltage between DC link nodes; an SR converter coupled to the PFC converter via the DC link nodes; and a control circuit configured to operate the PFC converter in one of at least two operating modes, and operate the SR converter in one of at least two different operating modes dependent on an output voltage of the SR converter, regulate, by operating the SR converter, a voltage level of the DC link voltage dependent on a DC link voltage reference, wherein the at least two different operating modes of the SR converter include a buck mode and a series resonant mode.

Example 23—The power converter arrangement of example 22, wherein the control circuit is configured to operate the SR converter in the buck mode when the output voltage is lower than a first voltage threshold.

Example 24—The power converter arrangement of example 23, wherein the SR converter includes a transformer with a winding ratio wr between a number of windings np of a primary winding and a number of windings ns of a secondary winding, and wherein the first voltage threshold is given by $$Uth1 \geq \frac{Ull\_max}{wr},$$

where Ull_max is a maximum line-to-line voltage of the input voltage.

Example 25—The power converter arrangement of example 24, wherein $$Uth1 \geq \frac{Ull\_max}{wr} + v$$

where v is selected from between 0V and 20V.

Example 26—The power converter arrangement of any one of examples 22 to 25, wherein the SR converter includes a resonant circuit, and wherein the control circuit is configured to operate the SR converter in each of the at least two different operating modes such that the resonant circuit receives an alternating primary voltage based on a DC link voltage available between the DC link nodes.

Example 27—The power converter arrangement of example 26, wherein the resonant circuit has a resonant frequency, and wherein a frequency of the primary voltage is between 90% and 110% of the resonant frequency.

Example 28—The power converter arrangement of example 26 or 27, wherein the control circuit is configured, in the buck mode of the SR converter 12, to modulate an amplitude of the primary voltage relative to a voltage level of the DC link voltage.

Example 29—The power converter arrangement of example 28, wherein the control circuit is configured to operate the SRC converter such that, for modulating the amplitude of the primary voltage relative to the DC link voltage, half-periods are generated in which the primary voltage has a reduced amplitude that is lower than the DC link voltage for a predefined time duration.

Example 30—The power converter arrangement of example 29, wherein the reduced amplitude is zero.

Example 31—The power converter arrangement of example 29, wherein the reduced amplitude is between 40% and 60% of the DC link voltage.

Example 32—The power converter arrangement of any one of examples 29 to 31, wherein the predefined time duration is the duration of the respective half-period.

Example 33—The power converter arrangement of any one of examples 29 to 31, wherein the predefined time duration is less than the duration of the respective half-period.

Example 34—The power converter arrangement of any one of examples 22 to 33, wherein the at least two different operating modes of the PFC converter include a 1/3 mode and a 2/3 mode, and wherein the PFC converter is configured to operate in one of the at least two different operating modes dependent on the DC link voltage reference.

Example 35—The power converter arrangement of example 34, wherein the control circuit is configured to operate the PFC converter such that current waveforms of three input currents received by the PFC converter are regulated, to regulate switch node voltages of the PFC converter dependent on switch node voltage references for regulating the current waveforms of the three input currents, and to operate the PFC converter in one of the at least two different operating modes dependent on a relationship between the DC link voltage reference and a maximum switch node voltage reference.

Example 36—The power converter arrangement of example 35, wherein the control circuit is configured to operate the PFC converter in the 2/3 mode when the DC link voltage reference is higher than the maximum switch node voltage reference.

Example 37—The power converter arrangement of example 36, wherein the control circuit is configured to select the DC link voltage reference to be the larger of the maximum switch node voltage reference and an output voltage value that is dependent on the output voltage.

Example 38—The power converter arrangement of any one of examples 24 to 37, wherein the at least two operating modes of the SR converter further include a boost mode, and wherein the control circuit is configured to operate the SR converter in the boost mode when the output voltage is higher than a second voltage threshold.

Example 39—The power converter arrangement of example 38, wherein the control circuit is configured to operate the SR converter in the boost mode such that the DC link voltage is regulated to have a fixed voltage level.

Example 40—The power converter arrangement of example 38 or 39, wherein the SR converter includes a resonant circuit, and wherein the control circuit is configured to operate the SR converter in the boost mode such that an amplitude of a secondary voltage provided by the resonant circuit is modulated.

What is claimed is:

1. A power conversion method, comprising:
   operating a PFC converter configured to receive three input voltages and provide a DC link voltage between DC link nodes in one of at least two different operating modes; and
   operating an SR converter coupled to the PFC converter via the DC link nodes in one of at least two different operating modes dependent on an output voltage of the SR converter,
   wherein operating the SR converter comprises regulating a voltage level of the DC link voltage dependent on a DC link voltage reference, and
   wherein the at least two different operating modes of the SR converter include a buck mode and a series resonant mode.

2. The method of claim 1, wherein operating the SR converter in one of at least two different operating modes comprises:
   operating the SR converter in the buck mode when the output voltage is lower than a first voltage threshold.

3. The method of claim 2,
   wherein the SR converter comprises a transformer with a winding ratio wr between a number of windings np of a primary winding and a number of windings ns of a secondary winding, and
   wherein the first voltage threshold (Uth1) is given by $$Uth1 \geq \frac{Ull\_max}{wr},$$

where Ull_max is a maximum line-to-line voltage of the input voltage.

4. The method of claim 1,
   wherein the SR converter comprises a resonant circuit, and
   wherein operating the SR converter in each of the at least two different operating modes comprises generating an alternating primary voltage received by the resonant circuit based on a DC link voltage available between the DC link nodes.

5. The method of claim 4,
wherein the resonant circuit has a resonant frequency, and
wherein a frequency of the primary voltage is between 9% and 110% of the resonant frequency.

6. The method of claim 4,
wherein operating the SR converter in the buck mode comprises modulating an amplitude of the primary voltage relative to a voltage level of the DC link voltage.

7. The method of claim 6, wherein modulating the amplitude of the primary voltage relative to the DC link voltage comprises generating buck half-periods in which the primary voltage has a reduced amplitude that is lower than the DC link voltage for a predefined time duration.

8. The method of claim 7, wherein the predefined time duration is the duration of the respective half-period.

9. The method of claim 7, wherein the predefined time duration is less than the duration of the respective half-period.

10. The method of claim 7, further comprising:
generating a buck half-period dependent on a half-period signal,
wherein a signal level of the half-period signal is dependent on the DC link voltage reference and the DC link voltage, and
wherein a buck half-period is generated each time the half-period signal has a predefined first signal level.

11. The method of claim 10, wherein the half-period signal is generated such that the half-period signal has the first signal level when the DC link voltage is below the DC link voltage reference.

12. The method of claim 1,
wherein the at least two different operating modes of the PFC converter comprise a 1/3 mode and a 2/3 mode, and
wherein operating the PFC converter in one of the at least two different operating modes comprises operating the PFC converter in one of the at least two different operating modes dependent on the DC link voltage reference.

13. The method of claim 12,
wherein operating the PFC converter comprises regulating current waveforms of three input currents received by the PFC converter,
wherein regulating the current waveforms of the three input currents comprise regulating switch node voltages of the PFC converter dependent on switch node voltage references, and
wherein operating the PFC converter in one of the at least two different operating modes comprises operating the PFC converter in one of the at least two different operating modes dependent on a relationship between the DC link voltage reference and a maximum switch node voltage reference.

14. The method of claim 13, wherein the PFC converter is operated in the 2/3 mode when the DC link voltage reference is higher than the maximum switch node voltage reference.

15. The method of claim 14, wherein the DC link voltage reference is selected to be the larger of the maximum switch node voltage reference and an output voltage value that is dependent on the output voltage.

16. The method of claim 1,
wherein the at least two different operating modes of the SR converter further comprise a boost mode, and
wherein the method further comprises operating the SR converter in the boost mode when the output voltage is higher than a second threshold.

17. The method of claim 16, wherein operating the SR converter in the boost mode comprises regulating the DC link voltage such that the DC link voltage has a fixed voltage level.

18. A power converter arrangement, comprising:
a PFC converter configured to receive three input voltages and provide a DC link voltage between DC link nodes;
an SR converter coupled to the PFC converter via the DC link nodes; and
a control circuit configured to:
operate the PFC converter in one of at least two operating modes,
operate the SR converter in one of at least two different operating modes dependent on an output voltage of the SR converter, and
regulate, by operating the SR converter, a voltage level of the DC link voltage dependent on a DC link voltage reference,
wherein the at least two different operating modes of the SR converter include a buck mode and a series resonant mode.

* * * * *